United States Patent
Song et al.

(10) Patent No.: US 9,651,415 B2
(45) Date of Patent: May 16, 2017

(54) METHOD AND SYSTEM FOR MONITORING DISTILLATION TRAY PERFORMANCE

(71) Applicants: Limin Song, West Windsor, NJ (US); Yibing Zhang, Annandale, NJ (US)

(72) Inventors: Limin Song, West Windsor, NJ (US); Yibing Zhang, Annandale, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 398 days.

(21) Appl. No.: 14/226,961

(22) Filed: Mar. 27, 2014

(65) Prior Publication Data

US 2015/0177107 A1    Jun. 25, 2015

Related U.S. Application Data

(60) Provisional application No. 61/919,949, filed on Dec. 23, 2013.

(51) Int. Cl.
| | | |
|---|---|---|
| *G01H 11/00* | (2006.01) | |
| *G01H 9/00* | (2006.01) | |
| *G01K 11/32* | (2006.01) | |

(52) U.S. Cl.
CPC ......... *G01H 9/004* (2013.01); *G01K 11/3206* (2013.01)

(58) Field of Classification Search
CPC  G01M 99/00; G01H 1/00; G01H 3/00; A61B 5/0002; A61B 7/02; G01K 1/026; G01K 11/3213

(Continued)

(56) References Cited

U.S. PATENT DOCUMENTS

| | | | | |
|---|---|---|---|---|
| 4,529,029 A | * | 7/1985 | Block | B22D 11/186 164/151.3 |
| 5,712,275 A | * | 1/1998 | Van Gestel | A01N 43/88 504/155 |

(Continued)

FOREIGN PATENT DOCUMENTS

| | | |
|---|---|---|
| DE | 10149092 A1 | 4/2003 |
| DE | 102004031324 A1 | 1/2006 |
| GB | 2484990 A | 2/2012 |

OTHER PUBLICATIONS

J. Courivaud et al, "Fiber Optics Based Monitoring of Levees and Embankment Dams", 31st Annual USSD Conference, San Diego, California, Apr. 11-15, 2011.

(Continued)

*Primary Examiner* — Lisa Caputo
*Assistant Examiner* — Nigel Plumb
(74) *Attorney, Agent, or Firm* — Glenn T. Barrett

(57) ABSTRACT

Systems and methods for detecting an operational condition of a tray of a distillation column with a sensing cable including an optical fiber sensor array operatively coupled to an optical signal interrogator. An output of the sensing cable corresponding to at least one sensor location on the optical fiber sensor array is monitored. The output of the sensing cable is classified as one of a predetermined set of classifications including at least a stable condition classification and a unstable condition classification determined based upon the output relative to a predetermined threshold. A signal is generated when the output of the sensing cable is classified as the unstable condition classification.

36 Claims, 9 Drawing Sheets

(58) Field of Classification Search
USPC ........... 73/649, 570, 591; 181/131; 374/137, 374/161
See application file for complete search history.

(56) References Cited

U.S. PATENT DOCUMENTS

| | | | | |
|---|---|---|---|---|
| 6,581,445 B1* | 6/2003 | Weiss | ................... | G01N 33/246 73/73 |
| 6,853,798 B1* | 2/2005 | Weiss | ................... | G01K 11/32 374/E11.015 |
| 7,240,547 B2* | 7/2007 | Brown | ....................... | G01F 1/68 73/204.11 |
| 7,731,421 B2* | 6/2010 | Hadley | ................... | E21B 36/04 374/131 |
| 7,886,109 B2* | 2/2011 | Yamamoto | ............. | G06F 3/0625 711/111 |
| 8,123,400 B2* | 2/2012 | Andrejco | ........... | G01K 11/3206 374/131 |
| 8,584,519 B2* | 11/2013 | Maida | ................... | E21B 47/123 73/152.54 |
| 9,074,921 B1* | 7/2015 | Parker, Jr. | ................ | G01F 23/22 |
| 2003/0094281 A1* | 5/2003 | Tubel | ....................... | E21B 47/00 166/250.03 |
| 2004/0037752 A1* | 2/2004 | Herzog | ................... | G01K 11/32 422/131 |
| 2005/0011199 A1* | 1/2005 | Grisham | ................. | F25B 21/02 62/3.7 |
| 2006/0010973 A1* | 1/2006 | Brown | ....................... | G01F 1/68 73/204.11 |
| 2006/0214098 A1* | 9/2006 | Ramos | ................... | E21B 47/09 250/256 |
| 2007/0158064 A1* | 7/2007 | Pribnow | ............... | G01F 1/6884 166/250.01 |
| 2007/0234788 A1* | 10/2007 | Glasbergen | ........... | E21B 47/065 73/152.12 |
| 2008/0130707 A1* | 6/2008 | Yamamoto | .............. | G01K 11/32 374/131 |
| 2008/0239468 A1* | 10/2008 | Hamada | .............. | H01S 3/06704 359/333 |
| 2008/0317095 A1* | 12/2008 | Hadley | ................... | E21B 36/04 374/137 |
| 2009/0007652 A1* | 1/2009 | Childers | ................. | E21B 47/09 73/152.54 |
| 2010/0247027 A1* | 9/2010 | Xia | .................... | G01D 5/35303 385/12 |
| 2013/0072739 A1* | 3/2013 | Ruettinger | ............... | B01J 21/12 585/662 |
| 2014/0290343 A1* | 10/2014 | Kulkarni | ................ | G01M 3/002 73/40.5 R |
| 2014/0290357 A1* | 10/2014 | Zhang | ................... | G01F 23/246 73/295 |
| 2014/0294040 A1* | 10/2014 | Zhang | ................... | G01K 11/32 374/45 |
| 2014/0294041 A1* | 10/2014 | Zhang | ................... | G01F 1/684 374/54 |
| 2015/0177042 A1* | 6/2015 | Song | ........................ | G01F 1/74 73/861.04 |
| 2015/0268078 A1* | 9/2015 | Zhang | ................... | G01F 1/6884 374/45 |

OTHER PUBLICATIONS

Sanders, Paul E. et al., "Recent Developments in Fiber Optic Sensor Technology for High Temperature Well Monitoring", GRC Transactions, 2009, vol. 33, pp. 859-863.

* cited by examiner

METHOD AND SYSTEM FOR MONITORING DISTILLATION TRAY PERFORMANCE

CROSS REFERENCE TO RELATED APPLICATION

This application relates and claims priority to U.S. Provisional Patent Application No. 61/919,949, filed on Dec. 23, 2013.

BACKGROUND

Field

The presently disclosed subject matter relates to methods and systems for monitoring distillation tray performance. More particularly, the presently disclosed subject matter relates to detecting operational conditions in trays of a distillation column using an optical fiber for distributed temperature and/or acoustic measurements.

Description of Related Art

Components of certain equipment, such as that used in the petroleum and petrochemical industry, which includes the exploration, production, refining, manufacture, supply, transport, formulation or blending of petroleum, petrochemicals, or the direct compounds thereof, are often monitored to maintain reliable and optimal operation. However, such components can involve harsh conditions, such as high temperature, high pressure, and/or a corrosive environment, making it difficult or costly to obtain reliable measurements.

Monitoring of operational conditions of distillation column trays can provide for enhanced control an operation. For example, remedial action can be taken if an unstable operating condition, such as flooding and/or dry-out conditions, is detected. Moreover, tray performance can be optimized by, for example, maximizing the throughput while maintaining stable operation.

Conventional approaches to monitoring of operational conditions of distillation column trays can include measuring delta pressure across a column. As the column approaches an unstable condition, such as flooding, more liquid is held up by the upward vapor flow, and the delta pressure will increase. When the delta pressure reaches to a pre-selected threshold, operators can cut back the throughput to avoid a runaway, a condition when the delta pressure increases exponentially and the column reaches to an unsafe operating condition. However, it is well known that the delta pressure may fluctuate or change for many reasons other than flooding. Thus, thresholds indicative of flooding may not be reliable as a flood indicator. For example, the delta pressure can vary depending on the grade of the feed. Lighter grades can tend to flood sooner than the heavier ones. In addition, the delta pressure is not sensitive to subtle and localized flooding when the flood occurs in one single tray. Since a threshold is conventionally used, the delta pressure provides merely a rigid "yes" or "no" to the operators for flooding warning.

Other conventional approaches to monitoring of operational conditions of distillation column trays can include "gamma ray scanning." Generally, these techniques measure the density of the material through the vessel wall to determine the level of the froth on each tray as an indication of flooding. However, such techniques cannot be used for real-time operation and control.

Accordingly, there is a continued need for improved techniques monitoring the operating condition of individual trays within a distillation column.

SUMMARY OF THE INVENTION

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings. To achieve these and other advantages and in accordance with the purpose of the disclosed subject matter, as embodied and broadly described, the disclosed subject matter includes systems and methods for detecting an operational condition of a tray of a distillation column.

In accordance with one aspect of the disclosed subject matter, a method for detecting an operational condition of a tray of a distillation column includes providing within a tray of a distillation column a sensing cable including an optical fiber sensor array operatively coupled to an optical signal interrogator and monitoring an output of the sensing cable corresponding to at least one sensor location on the optical fiber sensor array. The method includes classifying the output of the sensing cable as one of a predetermined set of classifications including at least a stable condition classification and a unstable condition classification determined based upon the output relative to a predetermined threshold. The method includes generating a signal when the output of the sensing cable is classified as the unstable condition classification.

In certain embodiments, generating the signal can include transmitting the signal to one or more of an electronic display or an alarm. Additionally or alternatively, generating the signal can include transmitting the signal to a control unit configured to alter operational parameters of the distillation column.

As embodied herein, the optical signal interrogator can be adapted to measure temperature at the at least one sensor location and the output of the sensing cable can be a temperature measurement. The at least one sensor location can be provided within the tray of the distillation column a distance above a bottom surface of the tray corresponding to a froth level at the predetermined threshold, and classifying the output of the sensing cable can include comparing the temperature at the at least one sensor location to at least one of a first predetermined range of temperatures corresponding to the unstable condition and a second predetermined range of temperatures corresponding to the stable condition. Additionally or alternatively, the optical signal interrogator can be adapted to measure sound at the at least one sensor location and the output of the sensing cable can be an acoustic parameter. Classifying the output of the sensing cable can include comparing the acoustic parameter of the at least one sensor location to at least one of a first predetermined range of acoustic parameters corresponding to the unstable condition classification and a second predetermined range of acoustic parameters corresponding to the stable condition classification.

In certain embodiments, the sensing cable can include a heating element aligned with the optical fiber sensor array, and the method can include propagating at least one heat pulse through the heating element along at least a portion of the sensing cable to affect an exchange of thermal energy between the heating element and one or more media exposed to the sensing cable. The optical signal interrogator can be adapted to measure a temperature profile of the sensing cable corresponding to the heat pulse at the at least one sensor location, and classifying the output of the sensing cable can include determining one or more properties of the media exposed to the sensing cable at the at least one sensor location based on the temperature profile. Classifying the output of the sensing cable can further include comparing the one or more properties of the media to at least one of a first predetermined range of properties corresponding to the stable condition classification and a second predetermined range of properties corresponding to the unstable condition classification. The optical fiber sensor array can include a plurality of sensor locations aligned orthogonally to a bottom surface of the tray, and determining one or more properties of the one or more media exposed to the sensing cable can include identifying a level of an interface between media in a froth state and a vapor state, and wherein classifying the output of the sensing cable can include comparing the level of the interface to at least one of a first predetermined range of interface levels corresponding to the stable condition classification and a second predetermined range of interface levels corresponding to the unstable condition classification.

In accordance with another aspect of the disclosed subject matter, a system for detecting an operational condition of a tray of a distillation column includes a sensing cable including an optical fiber sensor array provided within a tray of a distillation column and an optical signal interrogator operatively coupled with the optical fiber sensor array. The optical signal interrogator is adapted to receive a signal and configured to monitor an output of the sensing cable corresponding to at least one sensor location on the optical fiber sensor array. The system includes a control unit, coupled the optical signal interrogator, to classify the output of the sensing cable as one of a predetermined set of classifications including at least a stable condition classification and a unstable condition classification determined based upon the output relative to a predetermined threshold, and configured to generate a signal when the output of the sensing cable is classified as the unstable condition classification.

In certain embodiments, the system can include one or more of an electronic display and an alarm adapted to receive the signal generated by the control unit. Additionally or alternatively, the control unit can be configured to alter operational parameters of the distillation column upon detection of the unstable condition.

As embodied herein, the optical signal interrogator can be adapted to measure temperature at the at least one sensor location the output of the sensing cable can be a temperature measurement. The at least one sensor location can be provided within the tray of the distillation column a distance above a bottom surface of the tray corresponding to a froth level at the predetermined threshold, and the control unit can be configured to classify the output of the sensing cable by comparing the temperature at the at least one sensor location to at least one of a first predetermined range of temperatures corresponding to the unstable condition and a second predetermined range of temperatures corresponding to the stable condition. Additionally or alternatively, the optical signal interrogator is adapted to measure sound at the at least one sensor location and the output of the sensing cable can be an acoustic parameter. The control unit can be configured to classify the output of the sensing cable by comparing the acoustic parameter of the at least one sensor location to at least one of a first predetermined range of acoustic parameters corresponding to the unstable condition classification and a second predetermined range of acoustic parameters corresponding to the stable condition classification.

In certain embodiments, the sensing cable can include a heating element aligned with the optical fiber sensor array, and the system can further include an excitation source configured to propagate at least one heat pulse through the heating element along at least a portion of the sensing cable to affect an exchange of thermal energy between the heating element and one or more media exposed to the sensing cable. The optical signal interrogator can be adapted to measure a temperature profile of the sensing cable corresponding to the heat pulse at the at least one sensor location, and the control unit can be configured to classify the output of the sensing cable by determining one or more properties of the media exposed to the sensing cable at the at least one sensor location based on the temperature profile. The control unit can further be configured to classify the output of the sensing cable by comparing the one or more properties of the media to at least one of a first predetermined range of properties corresponding to the stable condition classification and a second predetermined range of properties corresponding to the unstable condition classification. The optical fiber sensor array can include a plurality of sensor locations aligned orthogonally to a bottom surface of the tray, and the control unit can be configured to determine one or more properties of the one or more media exposed to the sensing cable by identifying a level of an interface between media in a froth state and a vapor state, and classify the output of the sensing cable includes comparing the level of the interface to at least one of a first predetermined range of interface levels corresponding to the stable condition classification and a second predetermined range of interface levels corresponding to the unstable condition classification.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

DETAILED DESCRIPTION

Figure 1A:
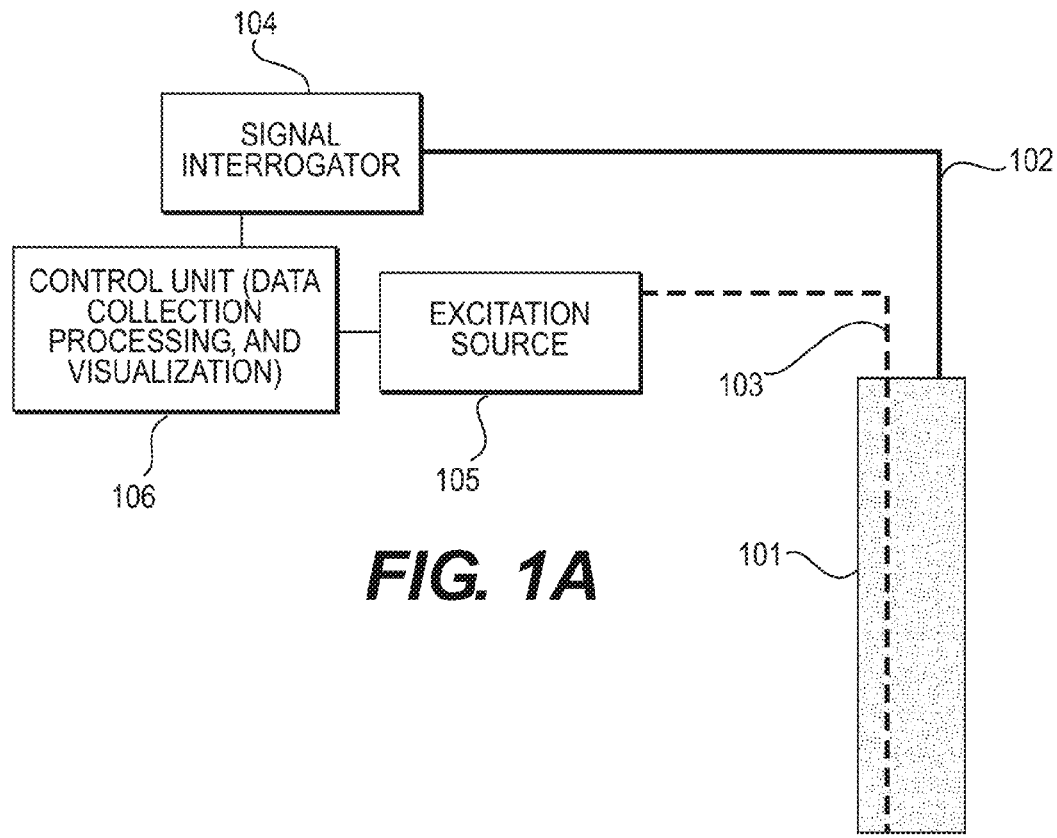
FIG. 1A is a schematic diagram of an exemplary sensing system in accordance with the disclosed subject matter.

As noted above, and in accordance with one aspect of the disclosed subject matter, methods disclosed herein include detecting an operational condition of a tray of a distillation column. The method includes providing within a tray of a distillation column a sensing cable including an optical fiber sensor array operatively coupled to an optical signal interrogator and monitoring an output of the sensing cable corresponding to at least one sensor location on the optical fiber sensor array. The method includes classifying the output of the sensing cable as one of a predetermined set of classifications including at least a stable condition classification and a unstable condition classification determined based upon the output relative to a predetermined threshold. The method includes generating a signal when the output of the sensing cable is classified as the unstable condition classification.

Furthermore, systems for detecting an operational condition of a tray of a distillation column are also provided. Such systems include a sensing cable including an optical fiber sensor array provided within a tray of a distillation column and an optical signal interrogator operatively coupled with the optical fiber sensor array. The optical signal interrogator is adapted to receive a signal and configured to monitor an output of the sensing cable corresponding to at least one sensor location on the optical fiber sensor array. The system includes a control unit, coupled the optical signal interrogator, to classify the output of the sensing cable as one of a predetermined set of classifications including at least a stable condition classification and a unstable condition classification determined based upon the output relative to a predetermined threshold, and configured to generate a signal when the output of the sensing cable is classified as the unstable condition classification.

Reference will now be made in detail to the various exemplary embodiments of the disclosed subject matter, exemplary embodiments of which are illustrated in the accompanying drawings. The accompanying figures, where like reference numerals refer to identical or functionally similar elements, serve to further illustrate various embodiments and to explain various principles and advantages all in accordance with the disclosed subject matter. The accompanying figures, where like reference numerals refer to identical or functionally similar elements, serve to further illustrate various embodiments and to explain various principles and advantages all in accordance with the disclosed subject matter. For purpose of explanation and illustration, and not limitation, exemplary embodiments of the disclosed subject matter are shown in FIGS. 1-7.

In accordance with the disclosed subject matter, characteristics of one or more materials can be measured with the use of an optical fiber sensor array having a plurality of sensor locations aligned with a heating/cooling element in a sensing cable. At least one heating/cooling pulse is propagated through the heating/cooling element along at least a portion of the sensing cable to affect an exchange of thermal energy between the heating/cooling element and one or more media exposed to the sensing cable. A temperature profile of the sensing cable (e.g., in the time domain and/or spatial domain) corresponding to the heating/cooling pulse at the plurality of sensor locations on the optical fiber sensor array can be measured to support a variety of techniques in accordance with the disclosed subject matter.

Generally, for purpose of illustration and not limitation, thermal properties, such as material density, thermal conductivity, heat capacity, or heat diffusion coefficient, of one or more materials can be measured by generating a heat disturbance and sensing a temperature response. In like fashion, dynamic physical properties, such as the flow of a material, can also be measured. As disclosed herein, techniques for measuring temperature can include obtaining temperature measurements in both the temporal and spatial domain. For example, distributed temperature sensing (DTS) systems can provide temperature measurements along the length of a sensing cable continuously or at regular intervals. The change in these temperature measurements can correspond to certain properties of a surrounding material or materials.

For purpose of illustration, and not limitation, an exemplary system for measuring the characteristics of a material in accordance with certain embodiments of the disclosed subject matter will be described. In general, with reference to FIG. 1A, an exemplary sensing system in accordance with the disclosed subject matter can include a sensing cable 101 having disposed therein a heating/cooling device 103 and optical fiber sensor array having a plurality of sensors 102. The sensing cable 101 can be operatively coupled with a control unit 106. For example, the heating/cooling device 103 can be coupled with an excitation source 105, which in turn can be coupled with the control unit 106. Likewise, the optical fiber sensor array 102 can be coupled with a signal interrogator 104, which can be coupled with the control unit 106. Generally, uniform heat can be delivered (e.g., heat energy can be provided or absorbed) along the sensing cable 101 via the heating/cooling device 103 and the excitation source 105. A temperature profile or its variation with time (e.g., variation rate) can be measured using the optical fiber sensor array 102 and signal interrogator 104. The control unit 106 can be adapted to collect data, process data, and/or present data for visualization, for example via one or more displays (not shown).

Figure 1B:
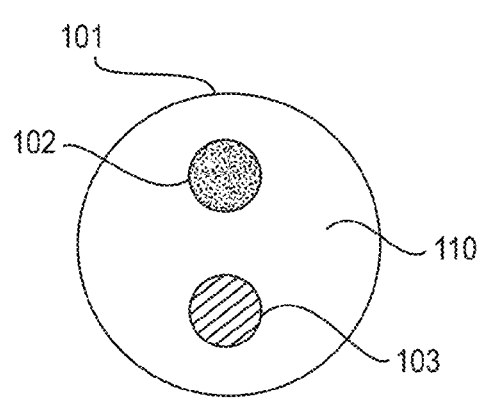
FIG. 1B is a cross sectional view of an exemplary sensing cable configuration in accordance with the disclosed subject matter.
Figure 1C:
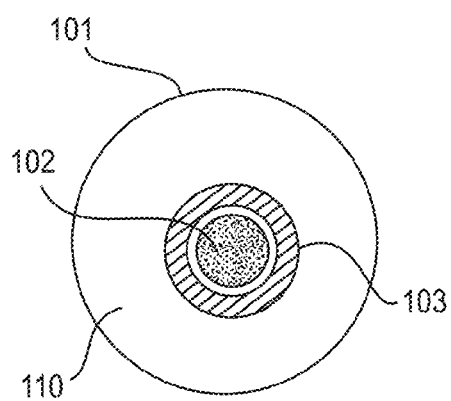
FIG. 1C is a cross sectional view of another exemplary sensing cable configuration in accordance with the disclosed subject matter.

The sensing cable 101 can be arranged in a variety of configurations. Two exemplary configurations are depicted in FIG. 1B and FIG. 1C, respectively. For example, FIG. 1B depicts a cross section of a sensing cable 101 with the heating/cooling device 103 and the optical fiber sensor array 102 arranged in parallel with each other. The sensing cable 101 can include, for example, an outer casing (not shown) optionally filled with a filler material 110 to maintain the heating/cooling device 103 and optical fiber sensor array 102 in place. Additionally or alternatively, the filler can be extended about the heating/cooling device 103 and temperature sensor 102 with or without the outer casing. The filler can be, for example, a material with high thermal conductivity, such as magnesium oxide (MgO). The outer casing can be a rigid and/or durable material, for example a metal tube. To ensure measurement accuracy, e.g., under harsh conditions, such as corrosion, the sensing cable 101 casing can be treated with a suitable coating. Alternatively, and as depicted in cross section in FIG. 1C, the heating/cooling device 103 and the temperature sensor array 102 can be generally coaxial with each other, wherein the heating/cooling device 103 is disposed concentrically around the temperature sensor array 102.

As embodied herein, the sensing cable 101 can be mineral insulated for protection of an optical fiber sensor array 102 including one or more optical fibers. The optical fibers can be coated and placed into a protective tube structure for enhanced mechanical integrity and resistance to adversary effects of environmental factors, such as $H_2$, $H_2S$ and moisture. The sensing cable 101 can further be protected using metal and mineral insulation material (e.g., MgO) for effective thermal conduction. The optical fibers can have a relatively small diameter, and thus can be placed into a protective tube with a relatively small diameter, allowing a faster thermal response and dynamic process monitoring. One of ordinary skill in the art will appreciate that the dimensions of the sensing cable 101 can be selected for a desired application. For example, if further protection from the local environment is desired, a sensing cable 101 with a larger diameter, and thus additional filler, can be selected.

Furthermore, a number of commercially available fibers for the temperature sensor 102 can be used, such as a Fiber Bragg Grating array, Raman scattering based sensor, Rayleigh scattering based sensor or Brillioun scattering based sensor. One of ordinary skill in the art will appreciate that each type of fiber sensor can have certain properties, such as response time, sensing resolution, immunity to hydrogen darkening, effective sensing cable length, and ability to sense temperature and/or strain, as illustrated for purpose of example and not limitation in Table 1. For example, a Fiber Bragg grating sensing system can include a relatively fast response time, high spatial resolution, and can be employed over a sensing cable length upwards of 100 km or longer in connection with the use of optical fiber amplifiers. Raman and Brillouin scattering sensing systems can have relatively low response times (e.g., on the order of several seconds), and spatial resolution on the order of centimeters. Rayleigh scattering sensing systems, when operated to sense temperature, can have a response time of several seconds with relatively high spatial resolution.

TABLE 1

| Sensor types | Fastest response time | Typical point sensor size (m) | Immunity to H2 darkening | Longest sensor cable length |
| --- | --- | --- | --- | --- |
| Fiber Bragg Grating (FBG) | <10 ms | 0.01 | high | <100 km or longer |
| Raman scattering sensor | >Several seconds | 0.25~0.5 | low | <100 km |
| Rayleigh scattering sensor (Temp) | >Several seconds | 0.01 | low | <70 m |
| Rayleigh scattering sensor (Acoustic) | <1 ms | 0.5 | low | <100 km |
| Brillouin scattering sensor | >Several seconds | 0.1~50 | low | <100 km |

One of ordinary skill in the art will also appreciate that certain of the various types of sensing systems can be used to sense temperature and/or strain (e.g., to sense acoustics). For example. Fiber Bragg Grating sensing systems can be used to measure both temperature and strain, for purposes of sensing temperature and acoustics. Raman scattering sensing systems are typically used to sense temperature. Brillouin scattering sensing systems can be used to measure temperature and strain, and are typically used to sense temperature. Rayleigh scattering sensing systems can be used to measure temperature and strain, and can be used to sense either temperature or acoustics. One of ordinary skill in the art will appreciate that when Rayleigh scattering sensing systems are used to sense acoustics, response time can increase to lower than 1 ms and spatial resolution can increase to approximately 50 cm.

Referring again to FIG. 1A, and as noted above, the control unit 106 can be coupled with the signal interrogator 104. The signal interrogator 104 can be, for example, an optical signal interrogator. Various optical signal interrogators may be used, depending on the type of optical fiber sensing techniques to be employed. The controller 106 can be adapted to perform signal processing on real-time temperature data provided by the signal interrogator 104. For example, the control unit 106 can be adapted to identify and record continuous or repeated temperature measurements at each of a plurality of sensor locations along the sensing cable 101. Additionally, the control unit 106 can be adapted to process temperature measurements over time to identify a characteristic of the material surrounding the sensing cable at one or more sensor locations.

As disclosed herein, a variety of suitable methods can be employed for generating the heating/cooling pulse along the sensing cable 101. As used herein, the term "pulse" includes a waveform of suitable shape, duration, periodicity, and/or phase for the intended purpose. For example, and not limitation, and as described further below, the pulse may have a greater duration for one intended use, such as the determination of deposits, and a shorter duration for another intended use, such as the determination of flow. As embodied herein, the heating/cooling device 103 can be an electrically actuated device. For example, the heating/cooling device 103 can include a resistive heating wire, and the excitation source 105 can be electrically coupled with the heating wire and adapted to provide a current therethrough. Passing of a current through the resistive heating wire can provide thermal energy along the length of the sensing cable 101, thereby generating a uniform heating/cooling effect along the sensing cable. Alternatively, the heating/cooling device 103 can include a thermoelectric device, and can be likewise coupled to the excitation source 105. The thermoelectric device can use the Peltier effect to heat or cool a surrounding medium. That is, for example, the thermoelectric device can be a solid-state heat pump that transfers heat from one side of the device to the other. The thermoelectric device can be configured, for example, to provide heating to the optical fiber sensor for a certain polarity of electric potential and cooling for the opposite polarity. As disclosed herein, and for purpose of simplicity, the terms "heating/cooling device," and "heating/cooling pulse" will be referred to generally as a "heating device" or "heating element" and as a "heat pulse," respectively. Depending upon the context, such terms are therefore understood to provide heating, cooling, or both heating and cooling.

In certain embodiments of the disclosed subject matter, the excitation source 105 can be configured to deliver current in a predetermined manner. For example, the excitation source 105 can be configured to generate pulses having predetermined wave forms, such as square waves, sinusoidal waves, or saw tooth waves. The excitation source 105 can be configured to generate the pulses at a predetermined frequency. For example, and not limitation, and with reference to FIG. 2, the excitation source 105 can be configured to generate an electric pulse of a rectangular wave form 210 through the heating/cooling element 103. The electric pulse can create a heat pulse 220 in the heating/cooling element 103 with the same wave form. That is, for example, the heat flow through the heating/cooling element 103 can be given by $I^2R/A$, where I is the current, R is the resistance of the heating/cooling element 103, and A is the surface area of a cross section of the heating/cooling element 103. The heat pulse can result in a heat exchange between the sensing cable 101 and the surrounding media. The temperature at each sensor location can be recorded to generate a "temperature profile" 230 for each sensor location. For example, the temperature at each sensor location can be recorded with a sampling frequency of 50 Hz. The temperature profile 230 can correspond to characteristics of the medium surrounding the sensing cable 101 at each sensor location.

For purposes of illustration, and not limitation, the underlying principles of thermally activated ("TA") measurement techniques will be described generally. Prior to heating or cooling by the heating/cooling device 103, temperature measurements of the surrounding medium can be taken with the optical fiber sensor array 102 of the sensing cable 101 and the temperature profile can be recorded as a reference. Due to the Joule effect, the heating device 103 can deliver a constant and uniform heat along the cable, heating up both cable and surrounding medium near the cable surface. For purposes of illustration, the temperature measured by the optical fiber can be described by the following equation:

$$\frac{\partial T}{\partial t} = \frac{1}{mc_p}(\dot{E}_{gen} - \dot{E}_{loss}), \quad (1)$$

where $\dot{E}_{gen}$ is the heat generation rate per unit length from the heating device, $\dot{E}_{loss}$ is the heat loss rate due to heat transfer from the sensing cable to the surrounding medium, and m and $c_p$ represent the mass and heat capacitance of the sensing cable per unit length. The heat generation within the sensing cable due to the Joule effect can be given by:

$$\dot{E}_{gen} \propto Zi^2, \quad (2)$$

where Z is the impedance of the sensing cable per unit length and the rate of heat loss from the sensing cable to the surrounding media can be decomposed into heat diffusion and heat convection (e.g., $\dot{E}_{loss}$ can include both heat diffusion (conduction) in a stationary medium and or convective heat transfer in a flowing medium):

$$\dot{E}_{loss} = \dot{E}_{diffusion} + \dot{E}_{convection} \quad (3)$$

For a stationary medium, the heat loss term can be given as:

$$\dot{E}_{loss} \propto Ak\Delta T, \quad (4)$$

where A is effective heat transfer area of the sensing cable, k is effective heat conduction coefficient of the medium and $\Delta T$ is the effective temperature gradient across the sensing cable and the medium.

The heat capacitance of the cable per unit length can limit the frequency of the thermal response of the cable, and thus the cable can be designed with a heat capacitance suited to the desired data frequency. Because heat generation can be relatively constant and uniform, the rate of change in localized temperature can depend primarily on the heat transfer between the cable and the surrounding medium. If the localized heat transfer is high at a particular point on the sensing cable, then the rate of change of temperature at that point along the cable, measured by one temperature sensor in the optical fiber, can be small. Otherwise, the temperature changing rate will be large. When subject to a heterogeneous medium or a mixed medium consisting of layers of different fluids or the like, the spatial distribution of the temperature along the sensor array can be indicative of the interface between the different media.

For purpose of illustration, and not limitation, transient temperature analysis techniques to determine characteristics of a medium will now be described with the sensing cable modeled as an infinitely long thin cylinder placed in an infinite homogeneous medium. For purposes of this description, it is assumed that at time zero (t=0) an electrical current, i, and the heat generation rate per length of the cylinder is given by:

$$q = \pi r_0^2 z_0 i^2, \quad (5)$$

where $r_0$ is the radius of the cylinder, and $z_0$ is the resistance of the cylinder per unit of volume. A closed form solution for the temperature on the surface of the cylinder can be given as:

$$T(r_0, t) - T_\infty = \frac{q}{4\pi k} \int_{\frac{r_0^2}{4\alpha t}}^{\infty} \frac{e^{-u}}{u} du, \quad (6)$$

where k and $\alpha$ are the heat conductivity and diffusivity coefficients of the medium, and $T_\infty$ is the initial temperature distribution along the sensing cable. The normalized temperature change and normalized time t can be defined as:

$$\Delta T^* = \frac{T(r_0, t) - T_\infty}{q/(4\pi k)} \quad (7)$$

and $$t^* = \frac{4\alpha t}{r_0^2}. \quad (8)$$

Equation 6 can thus be given as:

$$\Delta T^* = \int_{1/t^*}^{\infty} \frac{e^{-u}}{u} du. \quad (9)$$

The incomplete gamma function can have following expansion form for small but non-zero value of z (0<z<2.5):

$$\Gamma(z) = \int_z^{\infty} \frac{e^{-u}}{u} du = -\gamma - \ln(z) - \sum_{n=1}^{\infty} \frac{(-z)^n}{n(n!)}. \quad (10)$$

The temperature response as given by equation 6 above can be further approximated as $$\Delta T^* \approx -\gamma - \ln(1/t^*), \quad (11)$$

when $$z = 1/t^* \ll 1. \quad (12)$$

In accordance with this illustrative and non-limiting model, comparison of the normalized temperature change as a function of normalized time (e.g., as given by equation 9 and equation 11, respectively) indicates that when the normalized time is greater than approximately 10, equation 11 is a good approximation of normalized temperature change. Moreover, equation 11 above indicates that temperature change can increase linearly with the log of time when the heating time is sufficiently large so as to satisfy the criteria in equation 12. Thus, the equation can be written as:

$$\Delta T(r_0, t) \approx a + b \ln(t), \quad (13)$$

where parameters a and b are function of thermal properties of the medium for given heating rate, and are given by:

$$a = \frac{q}{4\pi k}\left(-\gamma - \ln\left(\frac{r_0^2}{4\alpha}\right)\right) \quad (14)$$

and $$b = \frac{q}{4\pi k}. \quad (15)$$

Thus, equation 13 can provide a theoretical basis for determining the thermal properties of a medium based on measurement of transient temperature. One of ordinary skill in the art will appreciate that continuous heating can consume more electrical energy and make measurements less sensitive to dynamic change of the thermal properties to be measured (e.g., when the medium mixture changes with time), and thus pulsed heating in accordance with the disclosed subject matter can provide benefits such as decreased electrical energy usage and for measurement of dynamic conditions of surrounding materials.

For purpose of illustration, and not limitation, an exemplary method of measuring the characteristics of the media surrounding the sensing cable using thermal analysis sensing techniques will be described. In general, an optimized waveform of electrical pulse (for example, a square wave) can be delivered along the length of the heating/cooling device 103, and temperature can be monitored using a temperature sensor array 102, e.g., optical fiber sensors. Owing to the uniformity of the heating/cooling effect along the sensing cable, temperature readings can vary depending on localized heat transfer process, which can be a function of the thermal properties (e.g., thermal conductivity, heat capacity) and physical conditions (static or flow) of the medium surrounding the sensing cable 101. The control unit 106 can be adapted to determine the characteristics of the surrounding media simultaneously, using the temperature profile.

A single heating pulse (e.g., arising from an optimized waveform of electrical pulse) can create a temperature response which can be derived in accordance with the exemplary and non-limiting model described herein using superposition as follows:

$$T(r_0, t) - T_\infty = \frac{q}{4\pi k}\left(\int_{\frac{r_0^2}{4\alpha t}}^{\infty} \frac{e^{-u}}{u} du - \int_{\frac{r_0^2}{4\alpha(t-t_0)}}^{\infty} \frac{e^{-u}}{u} du\right). \quad (16)$$

The first term in the bracket of equation 16 can represent the heating from t to $t_0$, and the 2nd term the cooling after $t_0$. Data collected during heating and cooling are analyzed separately, as disclosed herein, to derivate estimates of thermal properties of the medium.

Based upon the above, the control unit 106 can be adapted to determine the characteristics of the surrounding media using a variety of suitable techniques. For example, the temperature profile at each sensor location can be used to determine the characteristics of the surrounding media directly. The temperature measurements during heating and/or cooling of the sensing cable, corresponding to the timing of the rectangular electrical pulse, can be used to generate a feature-temperature profile at each sensor location. For example, the feature-temperature profiles can be extracted from the temperature data at distinctive conditions: heating (e.g., the condition during which the heat pulse is passing over a sensor location), cooling (e.g., the condition during which the heat pulse has passed over the sensor location and heat is being exchanged between the sensing cable and the surrounding media) and peak temperature (e.g., approximately the maximum temperature recorded at the sensor location for each heat pulse).

Figure 3:
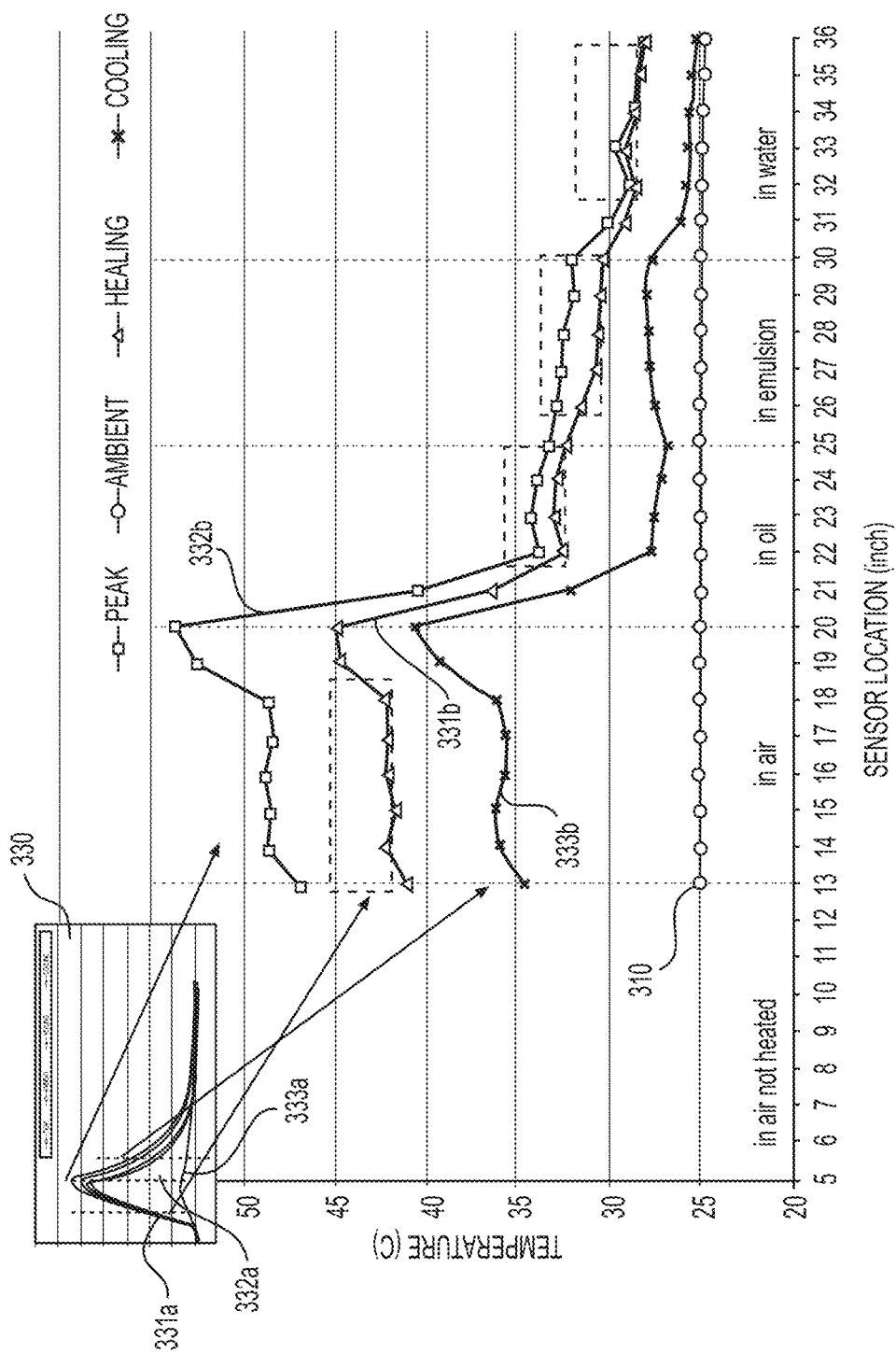
FIG. 3 is a graph illustrating a direct temperature sensing technique for a plurality of sensor locations in accordance with the disclosed subject matter.

For purpose of illustration, and not limitation, and with reference to FIG. 3, the control unit 106 can be configured to determine temperature characteristics of surrounding media using the feature-temperature profile at each sensor location. FIG. 3 shows distribution of feature temperatures along a sensing cable exposed to different media at different sensor locations. Graph 330 depicts the measured temperature profiles for a plurality of sensor locations. In accordance with the disclosed subject matter, feature-temperatures 331b, 332b, and 333b can be extracted from the measured temperature profile depicted in graph 330. For example, at each sensor location, feature-temperature 331b can correspond to a heating condition (e.g., while the heat pulse is passing over the sensor location), and can be extracted for each sensor location at a corresponding time 331a. Likewise, feature-temperature 332b can correspond to a peak temperature, and can be extracted for each sensor location at a corresponding time 332a. Similarly, feature temperature 333b can correspond to a cooling condition (e.g., after the heat pulse has passed over the sensor location and during which heat exchange between the cable and the surrounding media takes place) and can be extracted for each sensor location at a corresponding time 333a. Temperature 310 is the measured temperature at each sensor location during ambient conditions (e.g., no heat is applied).

As illustrated by FIG. 3, the feature temperature at each sensor location can correspond to the temperature characteristics of the surrounding media. For example, as depicted in FIG. 3, a 36 inch sensing cable arranged in a vertical configuration with a sensor disposed or located each unit inch along the cable can be exposed to a stack of air, oil, emulsion, and water. It should be noted that FIG. 3 depicts data from 24 sensor locations. Assuming each medium is stationary around the sensing cable, the rate of heat exchange, and thus the feature-temperature profiles 331b, 332b, and 333b, between the sensing cable and the surrounding media at each sensor location can correspond to the heat conduction of the surrounding media. That is, for example, heat transfer between the sensing cable and surrounding air can be lower than that between the sensing cable and water, as water has a higher heat conduction. Oil and emulsion layers can also be identified in this manner.

The determination of the characteristics of the media surrounding the sensing cable can be achieved by further configuring the control unit 106 to process the temperature profile. For example, in accordance with certain embodiments of the disclosed subject matter, the regression of the temperature over log of time can be performed over an interval of time corresponding to each heat pulse for each sensor location. The slope and intercept of the regression can be used to identify the material characteristics. For example, the regression can take the functional form of T=b+m ln(t), where T is the temperature measurement, ln(t) is the natural log of the time of the temperature measurement, b is the intercept of the regression, and m is the regression coefficient.

The interval over which the regression is taken can be, for example, during the heating condition described above (e.g., during which the heat pulse passes over the sensor location). Because heating can occur in a logarithmic manner, taking the regression as a function of the log of time and provide for results with lower error (e.g., a higher correlation coefficient). That is, for example, the temperature as a function of the log of time can be substantially linear over the heating period. Alternatively, the interval over which the regression is taken can be during the cooling condition described above. For purpose of illustration, and not limitation, for a square electrical pulse from 0 current to a constant non-zero value, the constant non-zero current value can correspond to the heating stage, and zero current can correspond to the cooling stage. The slope of the regression for the heating stage can be computed over a fraction of pulse duration when the current is non-zero, while slope of the regression for the cooling stage can be computed over a fraction of the time for which the current changes to zero value. Additionally or alternatively, the regression can take a number of suitable functional forms. For example, an nth order polynomial regression can be taken if the functional form of the temperature profile resembles an nth order polynomial.

Figure 4A:
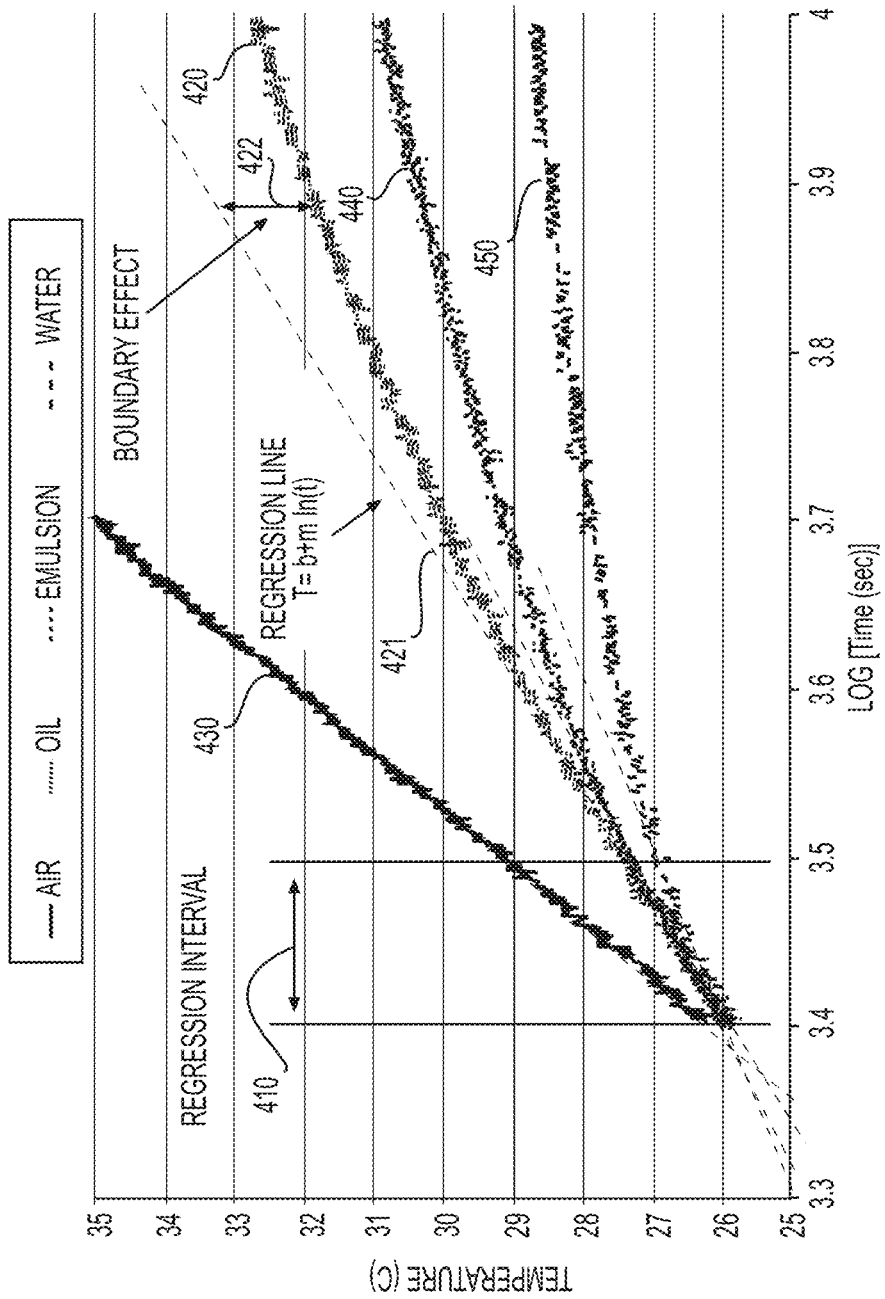
FIG. 4A is a graph illustrating log-time regression sensing technique in accordance with the disclosed subject matter.

For purpose of illustration, FIG. 4A shows the regression results of one temperature measurement at a sensor location in each material of FIG. 3. Line 420 corresponds to a plot of temperature at a sensor location in oil over the log of time. Likewise, lines 430, 440 and 450 correspond to a plot of temperature at a sensor location in air, emulsion, and water, respectively, over the log of time. Regression can be performed over a regression interval 410, which can correspond to the heating condition of the respective temperature sensor. The results of the regression can be plotted. For example, line 421 is a plot of the regression of line 420. As illustrated by FIG. 4A, the slope and intercept of each regression can correspond to a characteristic of the surrounding material, and such characteristics can be determined. That is, with reference to FIG. 4A, each material having different thermal characteristics can have a different slope and intercept, and can thus be identified. As depicted in FIG. 4A, The deviations in measurements resulting from the linear fitting line after the regression interval, as shown by line 420 and line 421, can be due to boundary effects from the wall of the vessel. One of ordinary skill in the art will appreciate that the description of the underlying principles herein assumes the thermal energy delivered by the sensing cable diffuses out without any boundaries. However, in the presence of such boundaries, thermal energy will be contained in a finite space and eventually thermal equilibrium will be reached. Accordingly, the regression interval can be selected based on a desired application, including corresponding boundary conditions.

Figure 4B:
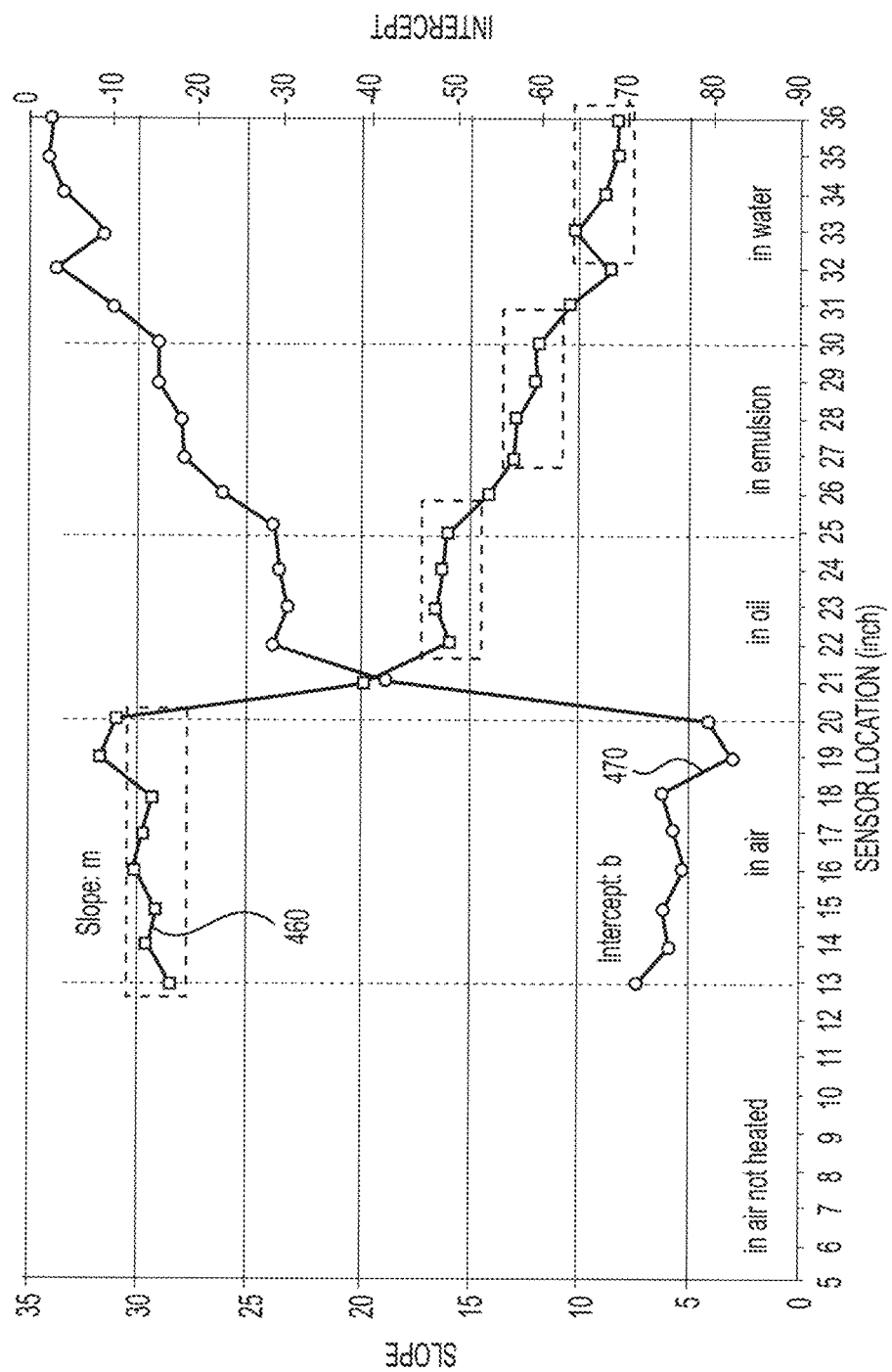
FIG. 4B is a graph illustrating log-time regression sensing technique for a plurality of sensor locations in accordance with the disclosed subject matter.

For purpose of illustration, FIG. 4B shows the regression results for 24 temperature sensors of FIG. 3, showing both slopes 450 and intercepts 470. As illustrated by FIG. 4A and FIG. 4B, in certain circumstances these techniques can provide determination of material characteristics with reduced error, comparing results from FIG. 4B with FIG. 3 to differentiate the emulsion layer and the oil layer. The interval over which the regression can be performed can be predetermined to reduce boundary effect errors (e.g., error 422 induced by boundary effects in the plot of line 420). That is, for example, taking the regression over a small interval can omit certain features of a temperature profile that can correspond to a particular characteristic. Accordingly, the regression interval can be predetermined such that errors induced by boundary effects are reduced. For example, the regression interval can be predetermined by calibration and/or with reference to known parameters or operating conditions of the system, such as expected features of a temperature profile.

In accordance with another aspect of the disclosed subject matter, enhanced determination of the characteristics of media surrounding the sensing cable can be achieved with a control unit 106 configured to process the temperature profile in the frequency domain. A N-pulse train (i.e., application of a certain periodic form of current through the sensing cable to generate N cycles of heating and cooling) can be propagated through the heating/cooling element 103. The period of a heating/cooling cycle, t0, the number of heating cycles, N, and the current amplitude, $I_0$, can be selected. The heating/cooling pulses can be applied to the heating/cooling element 103 with the excitation source 105 to generate thermal excitation within the sensing cable 101.

Temperature readings from the optical fiber sensor array 102 can be collected via the signal interrogator 104 at a selected sampling frequency. The sampling frequency can be, for example, at least twice the maximum signal frequency of interest. A temperature series, $T_i(1)$, $T_i(2)$, $T_i(3)$, ... can be generated where i=1, 2, 3, ... M, is the sensor index. In accordance with certain embodiments, synchronized sampling techniques can be employed to reduce the sample number, increase the signal to noise ratio, and improve Fourier transform accuracy. The time difference of the temperature readings $\Delta T=[T(k+1)-T(k)]/\Delta t$, can be calculated using the control unit 106 to generate time series of temperature derivative $\Delta T_i(1)$, $\Delta T_i(2)$, $\Delta T_i(3)$ ..., where sensor index i=1, 2, 3 ... M. In connection with the following description, the temperature difference, differenced temperature, or temperature derivatives are all referred to as the time series ΔT'. A transform (e.g., a Fast Fourier Transform [FFT], or Discrete Fourier Transform [DFT]) can be applied, using the control unit 106, to generate a spectrum of time series of temperature difference for M sensors. For each sensor, the real and imaginary values of the spectrum at fundamental frequency of N-Pulse train can be selected $f_0=1/t_0$. The characteristics of the surrounding media can thus be determined as disclosed herein using M pairs of the values derived from the spectrum of the temperature difference as described above. Alternatively, the frequency differenced spectrum (i.e., obtained by applying the operation of taking the derivative of the spectrum of temperature difference with respect to the frequency) and the real and imaginary values of the differenced spectrum can be used. The characteristics of the surrounding media can thus be determined as disclosed herein using M pairs of the values derived from the differenced spectrum as described above.

Figure 5A:
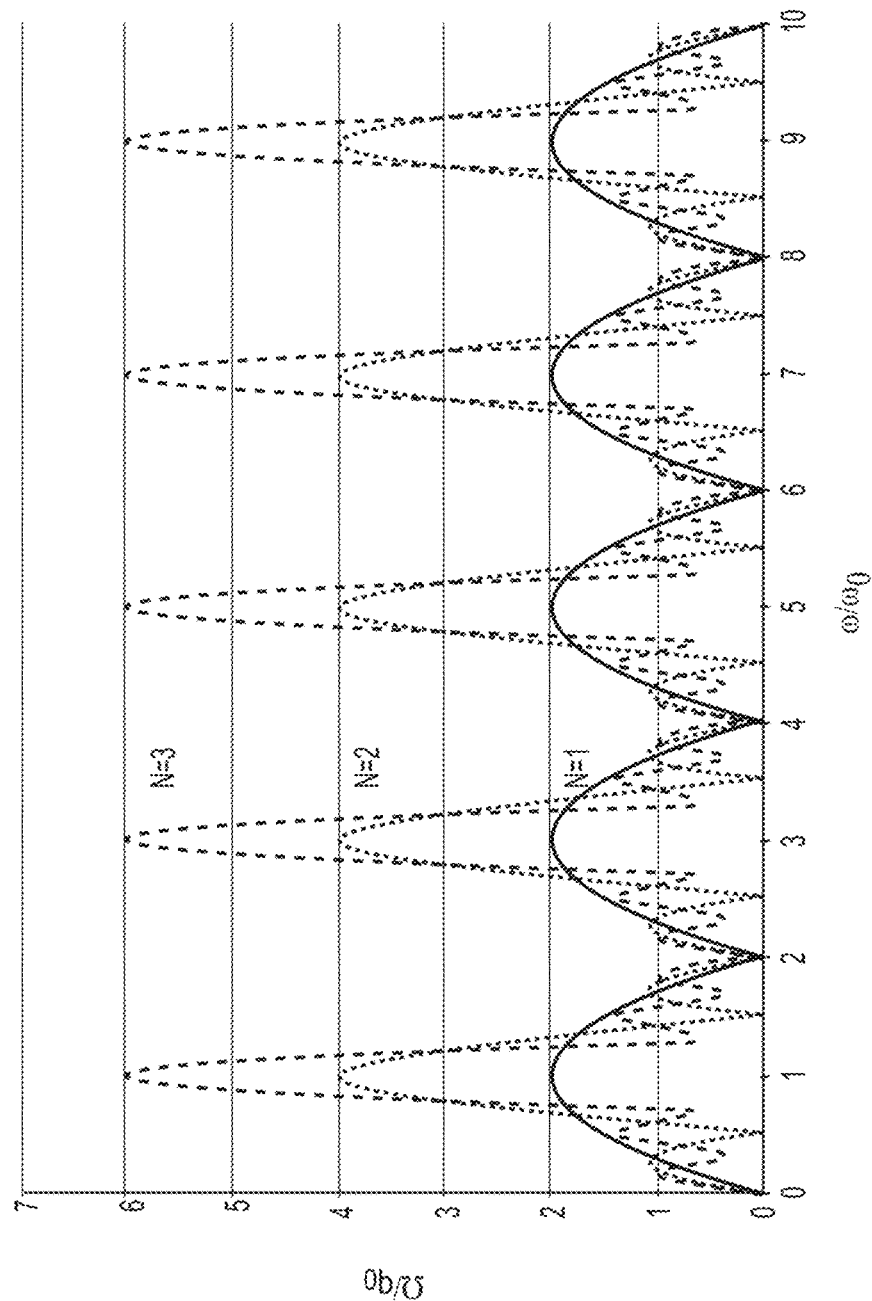
FIG. 5A is a graph illustrating thermal excitation energy concentration at harmonics and fundamental frequencies of heat pulses in connection with a frequency spectrum sensing technique.
Figure 5B:
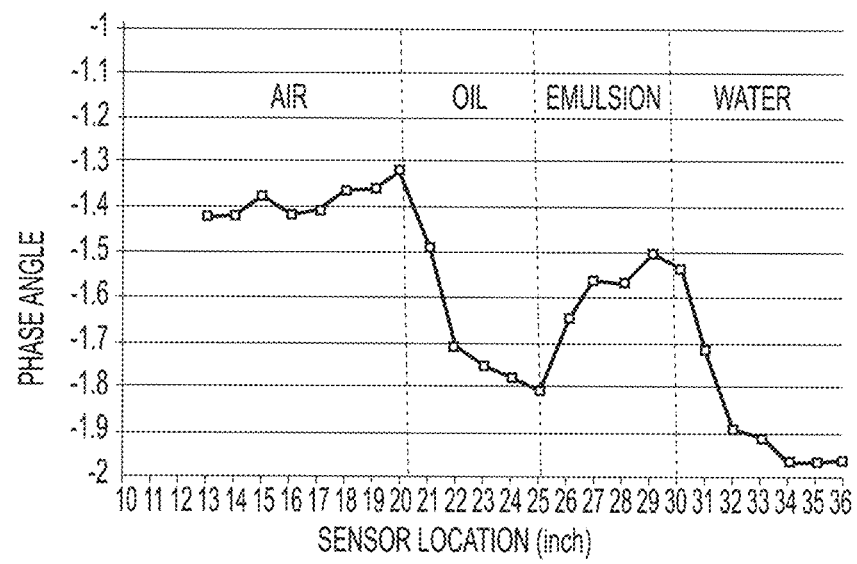
FIG. 5B is a graph illustrating the phase of a frequency-derivative spectrum in connection with frequency spectrum sensing techniques over a plurality of sensor locations in accordance with the disclosed subject matter.
Figure 5C:
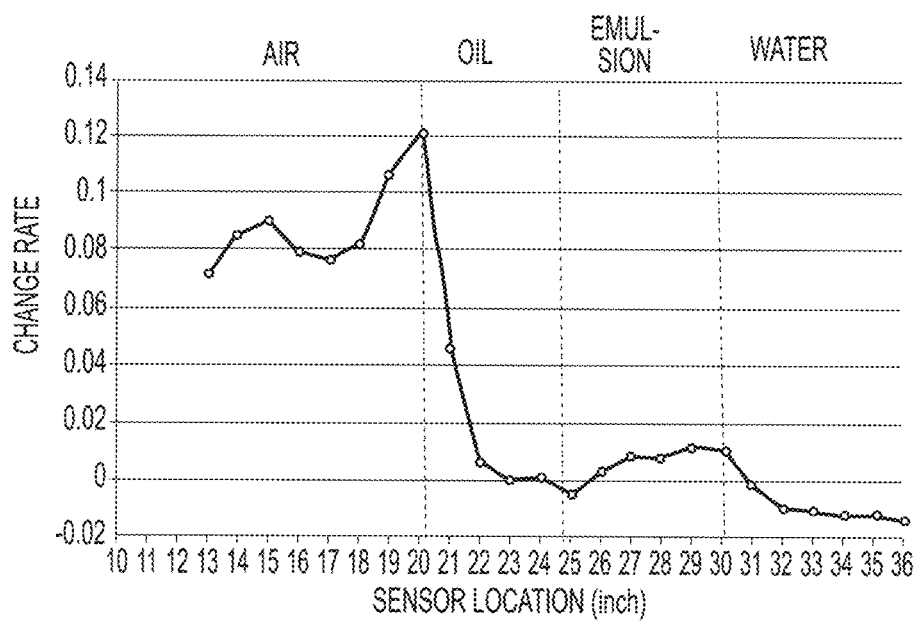
FIG. 5C is a graph illustrating the amplitude of a frequency-derivative spectrum in connection with frequency spectrum sensing techniques over a plurality of sensor locations in accordance with the disclosed subject matter.

That is, for example, the time derivative of the temperature data can be determined (i.e., resulting in the differenced temperature). The Fourier transform of the time-derivative temperature can then be determined, and the derivative of the complex spectrum with respect to the frequency can be calculated (i.e., resulting in the differenced spectrum). The amplitude and phase of the frequency-derivative spectrum (differenced spectrum) can then be calculated. The amplitude and phase of the frequency-derivative spectrum can correspond to the characteristics of the surrounding media at each sensor location. For purpose of illustration, FIG. 5B shows the phase of the frequency-derivative spectrum of the temperature measurements over the sensor locations as illustrated in FIG. 3. Likewise, FIG. 5C shows the amplitude of the frequency-derivative spectrum of the temperature measurements over the sensor locations as illustrated in FIG. 3. As illustrated by the figures, the techniques disclosed herein can provide for enhanced accuracy in the measurement and differentiation of the levels and interfaces between the air, oil, emulsion, and water layers.

As embodied herein, the sensing cable 101 can be calibrated, e.g., with the control unit 106. Calibration can include calibrating the sensor array to ensure that each sensor at a different location along the sensing cable provides the same output when subject to the same material of a constant thermal property. For example, the sensing cable 101 can be submerged into a homogenous medium of known thermal property, and the temperature measurements and processing techniques disclosed herein can be applied. If there is a difference between sensor output, the difference can be used as compensation and can be applied during measurements. Additionally, calibration can include ensuring that the sensor output accurately estimates the particular characteristic of interest (e.g., thermal conductivity and/or diffusivity). For example, a number of materials with known thermal properties can be measured for a broad range of values and a database can be constructed including correlations between measurements and determined characteristics of the known materials. The database can then be used to interpolate a measured characteristic of an unknown material.

Figure 2:
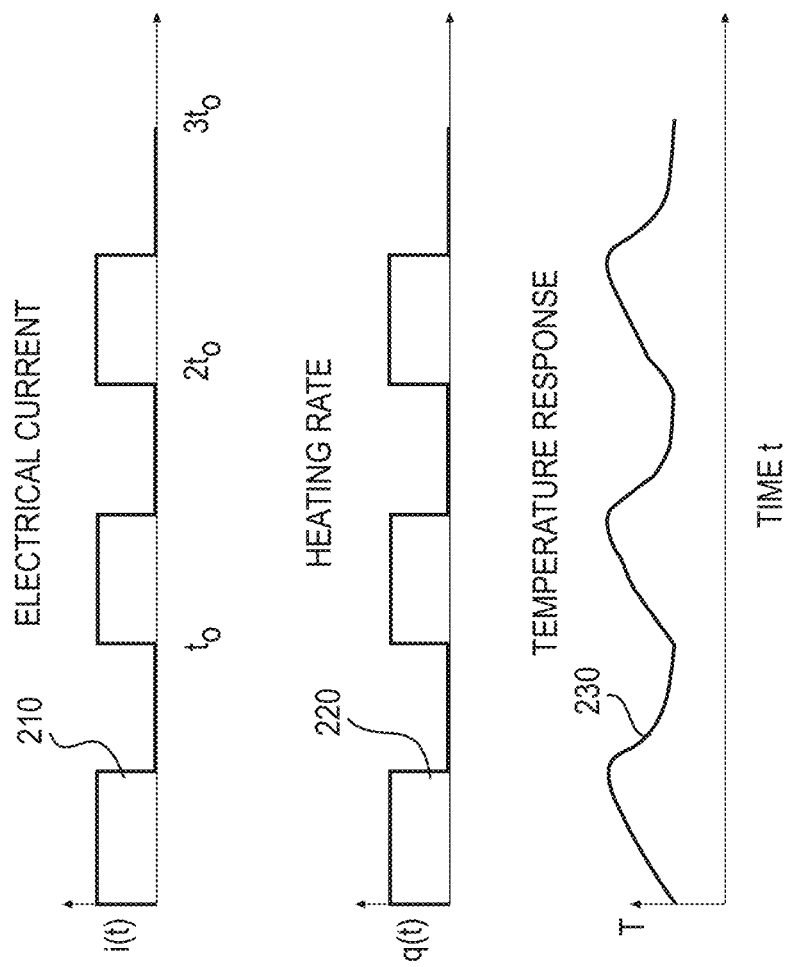
FIG. 2 depicts a representative plot of current and heat pulses and corresponding temperature response in accordance with the disclosed subject matter.

For purpose of illustration, and not limitation, the underlying theory of measurement techniques in accordance with this exemplary embodiment will be described. In connection with this description, for purpose of example, the waveform of the pulse train propagated through the heating device can be a square shape current, e.g., as illustrated in FIG. 2. The current can be defined mathematically as:

$$i(t) = \sum_{n=1}^{N} \left\{ H(t - (n-1)t_0) - H\left(t - \left(n - \frac{1}{2}\right)t_0\right) \right\} I_0, \quad (17)$$

where $t_0$ is the period, $I_0$ is the amplitude of the current, and H denotes the Heaviside step function defined by:

$$H(x - x_0) = \begin{cases} 0 & x < x_0 \\ 1 & x \geq x_0 \end{cases}. \quad (18)$$

The heating rate can thus be given as:

$$q(t) = \sum_{n=1}^{N} \left\{ H(t - (n-1)t_0) - H\left(t - \left(n - \frac{1}{2}\right)t_0\right) \right\} q_0, \quad (19)$$

where $q_0$ is related to the current by equation 5.

Instead of analyzing the temperature in time domain, the temperature rate, i.e., the derivative of the temperature with respect to time, can be considered in the frequency domain. The derivative operation, a high-pass filtering, can remove the slow-varying trend of the temperature for easier analysis. The time derivative of the temperature and heating generation rate can be defined as follows:

$$\dot{T}(r, t) = \frac{dT}{dt} \quad (20)$$

and $$\dot{q}(t) = \frac{dq}{dt}. \quad (21)$$

In frequency domain, the counterparts to the temperature and heating generation rate can be complex spectrum functions of $S(r, \omega)$ and $\Omega(\omega)$. For large distances away from the heating element, the thermal diffusion process can exhibit the behavior of an attenuated and dispersive wave. The complex spectrum of the change rate of the temperature on the sensing cable's surface can be given as:

$$S(r_0, \omega) = \frac{1}{2\pi k} \frac{\Omega(\omega)}{\kappa r_0} \frac{H_0^{(2)}(\kappa r_0)}{H_1^{(2)}(\kappa r_0)}. \quad (22)$$

The contribution of the heating component, $\Omega$ at a center frequency of $\omega$, to the change rate of the temperature on the sensing cable's surface can thus be given as:

$$d\dot{T}(r_0, \omega, t) = S(r_0, \omega)e^{j\omega t}d\omega. \quad (23)$$

Integration of above over all frequencies can recover the temperature rate in time domain. Therefore, S can be used as indicator of the medium. For purpose of illustration, and not limitation, the excitation term, $\Omega$ will now be described in greater detail. From equations 19 and 21, the derivative of the heating generation can be given as:

$$\dot{q}(t) = \sum_{i=1}^{N} \left\{ \delta(t - (i-1)t_0) - \delta\left(t - \left(i - \frac{1}{2}\right)t_0\right) \right\} q_0 \quad (24)$$

in time domain, and:

$$\Omega(\omega) = q_0 \left( e^{j\omega t_0} - e^{j\frac{\omega t_0}{2}} \right) \sum_{n=1}^{N} e^{j(n\omega t_0)} \quad (25)$$

in frequency domain. Because N is finite, $\Omega$ can contain all frequencies. The components a the harmonic frequencies can be given as:

$$\omega_k = k\omega_0 = k\frac{2\pi}{t_0}, \quad (26)$$

with index k.

Evaluation of equation 25 at the harmonic frequencies gives:

$$\Omega(\omega_k) = \begin{cases} 2Nq_0 & k = 1, 3, 5 \ldots \\ 0 & k = 0, 2, 4 \ldots \end{cases}. \quad (27)$$

As such, $\Omega$ peaks at odd harmonics but zeros at even harmonics. At non-harmonic frequencies, $\Omega$ is complex in general. FIG. 5A depicts an exemplary plot of $\Omega/q_0$ verse $\omega/\omega_0$ for N=1, 2, or 3. Accordingly, the thermal excitation energy can be concentrated at odd harmonics of fundamental frequency of pulses and increase as N increases.

As embodied herein, one of the odd harmonic frequencies can be chosen to increase signal to noise ratio in analysis of temperature measurements. In this manner, any temperature variation introduced by non-electrical heating can introduce noise which could be difficult to handle in time domain but can be reduced in frequency domain via N-pulse train: the number of cycles, N, can be increased to boost the peak value at odd harmonics. Additionally or alternatively, synchronized sampling techniques or harmonic tracking can also be used to reduce the noise.

In accordance with certain embodiments, the spectrum $S(\omega)$, e.g., as given in equation 22, can be used to estimate the thermal property of a medium surrounding the sensing cable. A characteristic frequency can be given as:

$$\omega^* = \frac{\alpha}{r_0^2}. \tag{28}$$

The complex argument to the Hankel functions can thus become:

$$\kappa r_0 = \sqrt{-j\frac{\omega}{\alpha}}\, r_0 = \sqrt{\frac{\omega}{\omega^*}}\, e^{j\theta}, \tag{29}$$

Where $\theta = 3/4\pi$ for $\omega > 0$. At low frequencies where $\omega/\omega^*$ (amplitude of $\kappa r_0$) is less than 1, the Hankel functions can be approximated as:

$$H_0^{(2)}(\kappa r_0) \approx 1 - \frac{(\kappa r_0)^2}{4} - j\frac{\pi}{2}\ln(\kappa r_0) \tag{30}$$

and:

$$H_1^{(2)}(\kappa r_0) \approx \frac{\kappa r_0}{2} - \frac{(\kappa r_0)^3}{16} + j\frac{2}{\pi}\frac{1}{\kappa r_0}. \tag{31}$$

The spectrum, S, can thus reduce to:

$$S(r_0, \omega) = \frac{\Omega}{2\pi k} \hat{X}\!\left(\frac{\omega}{\omega^*}\right), \tag{32}$$

where the normalized transfer function, and temperature change response to the thermal excitation $\Omega/2\pi k$ at frequency $\omega/\omega^*$ can be given as:

$$\hat{X}\!\left(\frac{\omega}{\omega^*}\right) = (R_s + jI_s) = X e^{j\phi}, \tag{33}$$

$$R_s \approx \frac{\frac{1}{32}\left(\frac{\omega}{\omega^*}\right)^2 + \frac{1}{2\pi}\frac{\omega}{\omega^*} + \frac{1}{2\pi}\left(\frac{\omega}{\omega^*} - \frac{4}{\pi}\right)\ln\!\left(\frac{\omega}{\omega^*}\right)}{\frac{1}{4}\left(\frac{\omega}{\omega^*}\right)^2 - \frac{2}{\pi}\left(\frac{\omega}{\omega^*}\right) + \frac{4}{\pi^2}}, \tag{34}$$

and $$I_s \approx \frac{\frac{5}{4}\left(\frac{\omega}{\omega^*} - \frac{4}{\pi}\right) - \frac{1}{16\pi}\left(\frac{\omega}{\omega^*}\right)^2 \ln\!\left(\frac{\omega}{\omega^*}\right)}{\frac{1}{4}\left(\frac{\omega}{\omega^*}\right)^2 - \frac{2}{\pi}\left(\frac{\omega}{\omega^*}\right) + \frac{4}{\pi^2}}, \tag{35}$$

after neglecting terms of higher order.

As disclosed herein, and in accordance with certain embodiments of the disclosed subject matter, the amplitude and phase can decrease monotonically with frequency so that higher frequency corresponds with lower response of temperature to the heating. Accordingly, lower frequencies can obtain significant heating response and higher signals. Additionally, the imaginary part of the complex spectrum can be nearly linear with the frequency while the real part can exhibit linear behavior beyond certain frequency values. Therefore, the derivative of the transfer function spectrum with respect to frequency can lead to constants beyond certain values of $\omega/\omega^*$. One of ordinary skill in the art will appreciate that, mathematically, the spectral derivative is equivalent to the Fourier transform of the temperature rate with respect to the log of time. Thus there is connection of the derivative spectrum with the linear relationship of the temperature change with log(t) in the time domain as shown in equation 13.

As embodied herein, systems and methods in accordance with the disclosed subject matter include monitoring an operational condition of one or more trays of a distillation column. The method includes providing within a tray of a distillation column a sensing cable including an optical fiber sensor array operatively coupled to an optical signal interrogator and monitoring an output of the sensing cable corresponding to at least one sensor location on the optical fiber sensor array. The method includes classifying the output of the sensing cable as one of a predetermined set of classifications in the at least a stable condition classification and a unstable condition classification determined based upon the output relative to a predetermined threshold. The method includes generating a signal when the output of the sensing cable is classified as the unstable condition classification.

The method and system disclosed herein can be used to monitor a variety of conditions of a tray of a distillation column. For example, distillation columns, as recognized in the art, may be subject to one or more unstable conditions, such as entrainment, flooding, dry-out, and/or weeping/dumping. In operation, each tray of a distillation tower can include one or more of liquid, vapor, or froth. Unstable operational conditions can correspond to the presence of absence of liquid, vapor, or froth at different locations within each tray.

Figure 6:
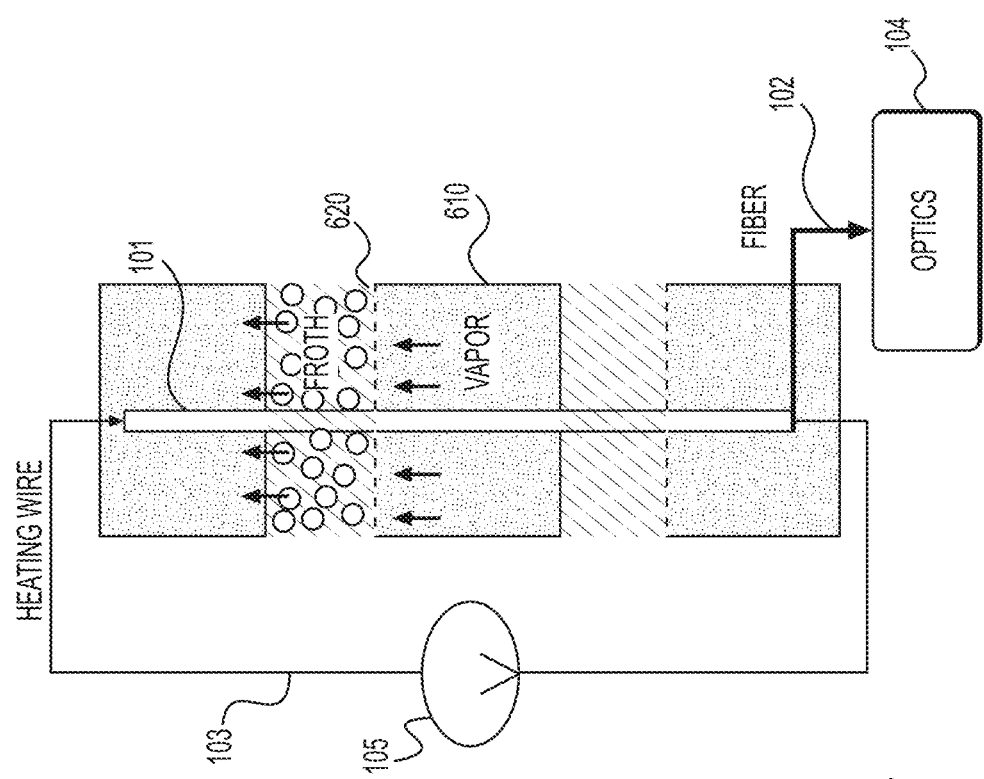
FIG. 6 is a schematic representation of a system and method for detecting a condition of a tray of a distillation column in accordance with the disclosed subject matter.
Figure 7:
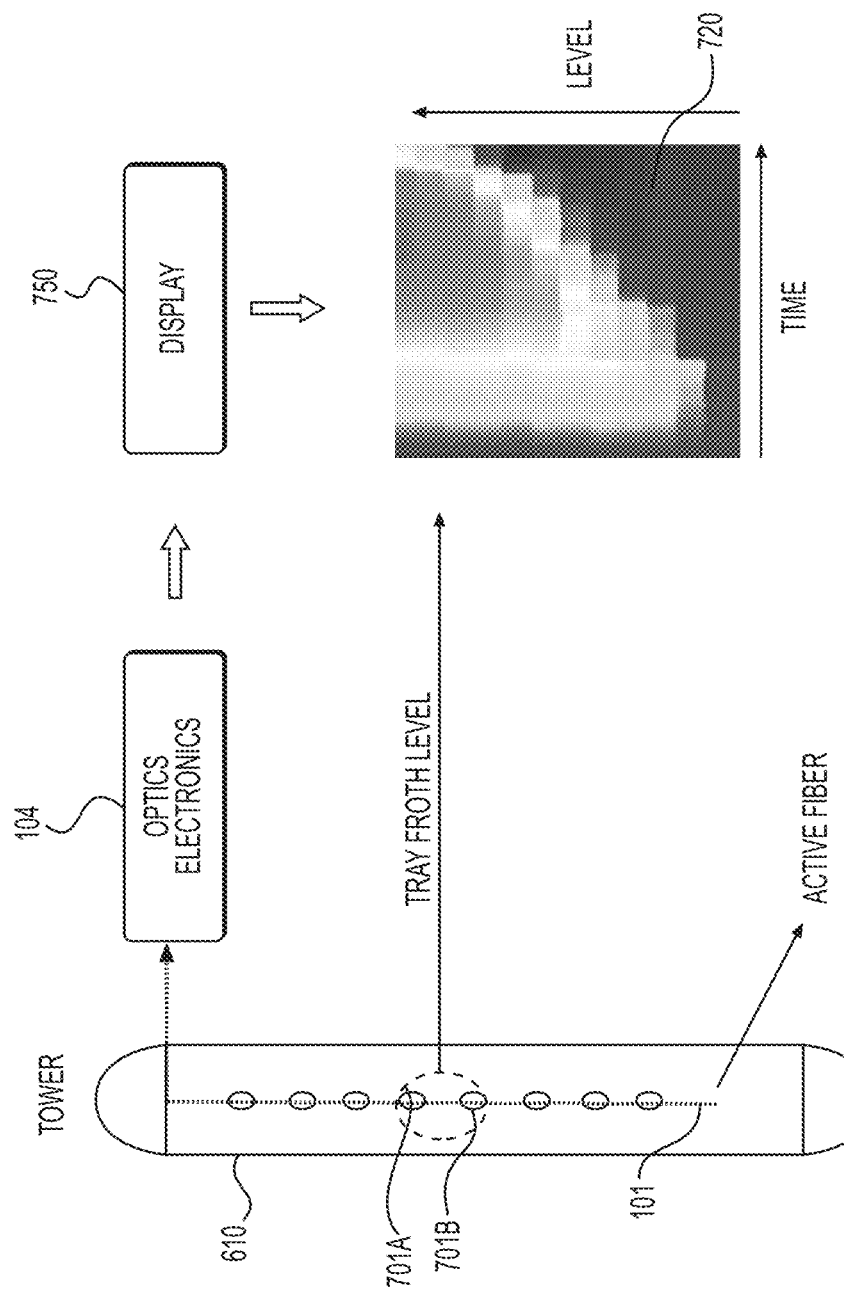
FIG. 7 is another schematic representation of a system and method for detecting a condition of a tray of a distillation column in accordance with the disclosed subject matter.

For purpose of example, and with reference to FIG. 6 and FIG. 7, the method and system for monitoring an operational condition of a tray can include providing within a tray 620 of a distillation column 610 a sensing cable 101 including an optical fiber sensor array 102 operatively coupled to an optical signal interrogator 104 and monitoring an output of the sensing cable 101 corresponding to at least one sensor location (e.g., 701a, 701b) on the optical fiber sensor array 102.

The output of the sensing cable 101 can, for example, correspond to the temperature at one or more sensor locations and the optical signal interrogator 104 can be adapted to measure temperature. At least one of the sensor locations (e.g., 701a) along the sensing cable can be positioned a distance above a bottom surface of the tray 620. The position of the sensor location 701a can correspond to a froth level at a predetermined threshold. For example, and not limitation, the froth level of tray 620 during stable operation of the distillation column can be determined and sensor location 701a can be positioned at this level. The temperature at sensor location 701a can be compared to at least one of a first predetermined range of temperatures corresponding to the unstable condition and a second predetermined range of temperatures corresponding to the stable condition. For example, a range of temperatures corresponding to a stable condition can be determined and recorded during stable operation of the distillation column 610 and the temperature at sensor location 701a can be compared thereto. Likewise, a range of temperatures corresponding to an unstable condition can be determined and recorded during unstable operation of the distillation column 610 and the temperature at sensor location 701a can be compared thereto. The temperature at sensor location 701a during monitoring can be classified by comparing the monitored temperature to the predetermined ranges.

An unstable condition of the tray of the distillation column 610 can be determined by identifying a change in the classification of the output of the sensing cable and a signal can be generated. For example, and not limitation, the signal can be transmitted to a display 750 configured to alert an operator of the distillation column 610 to the unstable condition. Additionally or alternatively, the signal can be transmitted to a control unit configured to alter operational parameters of the distillation column. For example, and not limitation, operation conditions such as throughput, withdraws, pump-around, temperature, and pressure can be altered such that overall column performance can be optimized. That is, for example, operational conditions can be altered to maximize throughput while maintaining each tray in stable operation.

Alternatively, the output of the sensing cable 101 can, for example, correspond to one or more acoustic parameters at one or more sensor locations and the optical signal interrogator 104 can be adapted to measure sound and/or dynamic pressure variation. The acoustic parameters can include, for example and not limitation, average sound pressure level, maximum sound pressure level, acoustic energy, or sound spectrum over a predetermined frequency range. The acoustic parameters at sensor location 701a can be compared to at least one of a first predetermined range of acoustic parameters corresponding to the unstable condition classification and a second predetermined range of acoustic parameters corresponding to the stable condition classification. For example, a range of acoustic parameters corresponding to a stable condition can be determined and recorded during stable operation of the distillation column 610 and the acoustic parameters at sensor location 701a can be compared thereto. Likewise, a range of acoustic parameters corresponding to an unstable condition can be determined and recorded during unstable operation of the distillation column 610 and the acoustic parameters at sensor location 701a can be compared thereto. The acoustic parameters at sensor location 701a during monitoring can be classified by comparing the monitored acoustic parameters to the predetermined ranges.

Additionally, acoustic measurement can be combined with temperature measurement using two parallel optical fiber arrays in a single sensing cable. The acoustic parameters and temperatures at sensor location 701a can be combined to be compared to at least one of a first predetermined range of paired values of acoustic parameters and temperature corresponding to the unstable condition classification and a second predetermined range of paired values of acoustic parameters and temperature corresponding to the stable condition classification. Combining or fusing two or more independent measurements for classification of operational state of the tray of distillation column can reduce the classification error and improve robustness.

For purpose of illustration, and not limitation, description is provided of certain embodiments of the disclosed subject matter in which the sensing cable 101 includes a heating element 103 aligned with the optical fiber sensor array 102 for propagating at least one heat pulse through the heating element 103 along at least a portion of the sensing cable 101 to affect an exchange of thermal energy between the heating element and one or more media exposed to the sensing cable. In this embodiment, the optical fiber sensor array 102 can include a plurality of sensor locations (e.g., 701a, 701b) aligned orthogonally to a bottom surface of the tray 620, and determining one or more properties of the one or more media exposed to the sensing cable can include identifying a level of an interface between media in a froth state and a vapor state.

Using the systems and techniques as disclosed, and suitable modifications as desired, a method of identifying levels and/or interfaces is provided and disclosed herein with reference to FIG. 1A through FIG. 5. One of ordinary skill in the art will appreciate that, during operation, a tray 620 of distillation column 610 can include a liquid layer, a froth layer, and a vapor layer. As previously noted, the sensing cable 101 includes a heating/cooling element, such as a heating wire, and an optical fiber sensor array, as disclosed herein. The optical fiber can include a plurality of sensing locations along the length of the fiber, such that each sensing location corresponds to a height above the bottom of tray 620. For example, and as previously noted, the optical fiber can include a plurality of sensors along its length and/or a single fiber sensor can be movable to define a plurality of sensor locations. The optical fiber sensor is coupled to an optical signal interrogator 104 to process an optical signal therein to obtain temperature measurements at each of the sensor locations. The optical signal interrogator 104 can further be coupled to a control unit to process the temperature measurements.

As previously described herein, the heating wire is coupled to an excitation source adapted to propagate electromagnetic waves (e.g., current 210) through the heating wire, thereby creating corresponding heat pulses (e.g., heat pulse 220). As the heat pulses propagate through the heating wire, heat is exchanged between the heating wire, the sensing cable, and the surrounding media at each sensor location. The temperature at each sensor location can be recorded, e.g., via the optical signal interrogator and control unit, to generate a temperature profile for each sensor location. For example, temperature can be measured as a function of time at each sensor location along the optical fiber. The temperature profile at each sensor location generally will correspond to the characteristics of the medium surrounding the sensing cable at that sensor location. In this manner, for purpose of illustration, sensor locations that are exposed to liquid, froth, and vapor can result in different temperature profiles.

The temperature profile (i.e., the temperature as a function of time at a sensor location) can generally exhibit an increase in temperature coinciding with the exposure to the heat pulse at the corresponding sensor location. For purpose of illustration, and not limitation, and with reference to the laws of thermodynamics, the temperature will generally increase over the duration of the heat pulse at a rate corresponding to the characteristics of the surrounding media, and thereafter decrease as the heat from the heat pulse diffuses into the surrounding media at a rate corresponding to the characteristics of the surrounding media. Thus, the temperature profiles for each sensor location can correspond to the characteristics of the surrounding media, e.g., via the heat capacity of the particular media. For example, and not limitation, at a sensing location exposed to vapor, the heat transfer from the heating wire into the surrounding vapor can be relatively low due to the low heat capacity and conductance of vapor. By contrast, at a sensing location exposed to liquid, the heat transfer from the heating wire into the surrounding liquid can be relatively high due to the relatively higher heat capacity and conductance of liquid.

As disclosed herein, the control unit thus can be adapted to determine the characteristics of the surrounding media at each sensor location using a variety of techniques, and thereby determine the level or interfaces between layers of the media in the tray. For example, the control unit can be adapted to determine, with reference to the known positions of the sensor locations and the corresponding temperature profiles, a difference in characteristics of the medium surrounding each sensor location and thus determine the interface or level of each medium. In like manner, interfaces between layers can be detected by identifying a change in temperature profile between sensor locations.

For purpose of illustration, and not limitation, the direct temperature measurement techniques described above can be used to determine the levels and/or interfaces between media in one or more trays of a distillation column. Particularly, and with reference to FIG. 3, a feature temperature profile (e.g., including three temperature measurements corresponding to a heating period, a peak temperature measurement, and a cooling period) can be extracted and processed to determine characteristics of the medium surrounding each sensor location. For example, and as depicted in FIG. 3, the temperature profile of sensors exposed to air can have a relatively higher peak, heating, and cooling temperature relative to the temperature profile of sensors exposed to oil, emulsion, and water. Similarly, the temperature profile of sensors exposed to vapor can have a relatively higher peak, heating, and cooling temperature relative to the temperature profile of sensors exposed to froth and liquid.

Alternatively, and as described herein with reference to FIG. 4B, a log-time regression technique can be used to determine the characteristics of the medium surrounds each sensor location by further processing the temperature profile at each sensor location. That is, by performing the regression of the temperature over log of time over an interval of time corresponding to each heat pulse for each sensor location, the resulting slope and intercept of the regression can be used to identify the characteristics of the medium. For example, and as shown in FIG. 4B, the slope and intercept of sensor locations exposed to air can be relatively high and relatively low, respectively. By contrast, the slope and intercept of sensor locations exposed to oil can be relatively low and high, respectively, relative to air. In like manner, the slope and intercept of sensor locations exposed to water can be lower and higher, respectively, than those of oil. One of skill in the art will appreciate that the slope and intercept of sensor locations exposed to vapor, froth, and liquid in a tray of a distillation column can likewise be distinguished.

In accordance with another exemplary embodiment of the disclosed subject matter, the frequency spectrum techniques disclosed herein with reference to FIG. 5A-C can be employed to determine the level and/or interfaces between media in the tray 620 with increased measurement sensitivity, accuracy, and/or reliability. In this exemplary embodiment, and as described above, an N-pulse train can be propagated through the heating wire of the sensing cable 101 with pre-selected parameters, including heating cycle period, $t_0$, number of heating cycles, N, and current amplitude, $I_0$. The parameters can be selected according to the operating characteristics of the distillation column 610 such that the resulting temperature profile can be measured with a desired signal-to-noise ratio. For example, a longer heating cycle period or higher current amplitude can result in higher signal-to-noise ratio relative to a shorter heating cycle period or lower current amplitude. Likewise, an increase in the number of heating cycles can further increase the signal-to-noise ratio. One of ordinary skill in the art will appreciate that such parameters can be varied depending upon desired application. For example, if determination of level and/or interfaces is desired at short time intervals, a shorter heating cycler period and a higher current amplitude can be employed. For purpose of example, and not limitation, in connection with a tray 620 of a distillation columns 610, the heating cycle period can be approximately several milliseconds to several seconds (i.e., the excitation source can be adapted to deliver a current pulse at approximately 0.01 Hz to 100 Hz). The current amplitude can be approximately 1 mA to approximately 1 A. One of ordinary skill in the art will appreciate that, in accordance with the disclosed subject matter, suitable frequency and current amplitude can be determined for a particular application by routine testing in accordance with known methods.

The optical signal interrogator 104 can be adapted to measure temperatures from the optical fiber at a pre-selected sampling frequency. In accordance with certain embodiments, the sampling frequency can be at least twice the expected frequency of the temperature profile and/or heat pulse, and in certain embodiments can be four to ten times the expected frequency. For example, and not limitation, in connection with a tray 620 of a distillation column 610 the sampling frequency can be 50 Hz or higher if the expected frequency is 25 Hz. The derivative with respect to time of the temperature measurements for each sensor location can then be generated. For example, the measured temperatures a sensor location at each sampling interval can be given as a temperature series. The difference between each temperature in the series can then be calculated to generate a temperature derivative series. A transform (e.g., a FFT or DFT) can be applied to convert the temperature derivative series into the frequency domain, and thus generate a spectrum of time series of temperature differences for each sensor location. The derivative of the spectrum, with respect to the frequency, can be generated. That amplitude and phase of the frequency-derivative spectrum (e.g., the real and imaginary parts of the complex frequency-derivative spectrum) can then be determined. For example, using the heating cycle period, to, the real and imaginary values of the spectrum at the fundamental frequency of the N-pulse train can be selected at $f_0=1/t_0$.

The amplitude and phase of the frequency-derivative spectrum at each sensor location, as depicted in FIG. 5B and FIG. 5C, thus can correspond to a particular medium surrounding the sensing cable 101 at a particular sensor location. For example, the amplitude and phase can decrease monotonically with frequency so that higher frequency corresponds with lower response to a change in temperature from the heating element. Accordingly, lower frequencies can obtain significant heating response and higher signals. Additionally, the imaginary part of the complex spectrum can be nearly linear with the frequency while the real part can exhibit linear behavior beyond certain frequency values. Therefore, the derivative of the spectrum with respect to frequency can correspond to the linear relationship of the temperature change with log(t) in the time domain. In this manner, and as depicted in FIG. 5B and FIG. 5C, the amplitude and phase of sensor locations exposed to air can be relatively high as compared to the amplitude and phase of sensor locations exposed to oil, emulsion, or water. The amplitude and phase of sensor locations exposed to oil can be lower than the amplitude and phase of air and can be higher than the amplitude and phase of water. The phase of sensor locations exposed to emulsion can be relatively high as compared to the phase of sensor locations exposed to oil and water and relatively low as compared to the phase of sensor locations exposed to air. The amplitude of sensor locations exposed to emulsion can be low as compared to the amplitude of sensor locations exposed to air, and can be high as compared to the amplitude of sensor locations exposed to water. One of skill in the art will appreciate that the amplitude and phase of sensor locations exposed to vapor, froth, and liquid in a tray of a distillation column can likewise be distinguished.

The sensing cable 101 can be calibrated, e.g., with the control unit. Calibration can include, for example, calibrating the sensor array to determine the amplitude and phase of the frequency-derivative spectrum of certain known media. For example, a number of materials with known thermal properties can be measured for a broad range of values and a database can be constructed including correlations between the generated amplitude and phase and characteristics of the known materials. The database can then be used as to determine the surrounding medium at a particular sensor location in the tray 620.

The control unit, with reference to the known locations of each sensor and the corresponding amplitude and phase of the frequency-derivative spectrum, can determine the level and/or interface between layers of different media in the tray 620. To determine the level of the various layers, the control unit can be configured to store the known position of each sensor location in one or more memories. For example, for a 36 inch tall tray with a sensing cable having 36 sensor locations, each spaced apart by a unit inch, the control unit can store the height value of each sensor location (i.e., for sensor location $i=\{1, 2, \ldots, 36\}$, the control unit can store a corresponding height measurement $H_i=\{1 \text{ in}, 2 \text{ in}, \ldots, 36 \text{ in}\}$). For each sensor location, i, the control unit can determine the amplitude and phase of the frequency derivative spectrum as disclosed herein. With reference to, for example, a database storing the amplitude and phase of the frequency derivative spectrum for known media, the control unit can thus determine which medium surrounds each sensor location using the determined amplitude and phase at each sensor location.

Additionally or alternatively, as embodied herein, the control unit can process the determined amplitude or phase of the frequency derivative spectrum of adjacent sensor locations to determine the location of interfaces between various layers in the tray 620. That is, for example, a change in the amplitude across two sensor locations, as illustrated in FIG. 5C, can correspond to an interface between those sensors. Likewise, a change in the phase, as illustrated in FIG. 5B, can correspond to an interface. In certain embodiments, the control unit can process both the amplitude and phase of adjacent sensors to enhance detection of interfaces. For example, a change in both the amplitude and phase can correspond to an interface.

The methods disclosed herein can provide for continuous profile monitoring in real time, and liquid, froth, and/or vapor levels or interfaces can be measured and visualized simultaneously. For example, the froth level can be depicted on a display 750 as a plot 720 of level over time. No moving mechanical parts need be included inside the sensing cable. Moreover, relative temperature changes before and after heating/cooling can be used to infer material thermal properties for level/interface measurement, and temperature baseline can be taken each time before heating/cooling is applied. Accordingly, the techniques disclosed herein need not require long term stability for temperature sensors.

Moreover, the system disclosed herein can operate at temperatures ranging from cryogenic temperatures up to over 1000° C. The size of the sensing cable can be relatively small (e.g., compared to conventional thermocouples) and can be cost effective for large area coverage with a large amount of sensors. Utilizing cost-effective optical fiber temperature sensors, the system disclosed herein can incorporate a large number of sensors, and can offer a high spatial resolution, e.g., less than 1 mm, over a long measurement range, e.g., several meters to kilometers. The diameter of the compact sensing cable can small, e.g., less than 2 mm. The small diameter of the sensing cable can allow for measurement in a tight space with reduced intrusiveness.

Additional Embodiments

Additionally or alternatively, the invention can include one or more of the following embodiments.

Embodiment 1: a method for detecting an operational condition of a tray of a distillation column, comprising: providing within a tray of a distillation column a sensing cable including an optical fiber sensor array, the optical fiber sensor array operatively coupled to an optical signal interrogator; monitoring with the optical signal interrogator an output of the sensing cable corresponding to at least one sensor location on the optical fiber sensor array; classifying the output of the sensing cable as one of a predetermined set of classifications including at least a stable condition classification and a unstable condition classification determined based upon the output relative to a predetermined threshold; and generating a signal when the output of the sensing cable is classified as the unstable condition classification.

Embodiment 2: the method of any of the previous embodiments, wherein generating the signal includes transmitting the signal to one or more of an electronic display or an alarm.

Embodiment 3: the method of any of the previous embodiments, wherein generating the signal includes transmitting the signal to a control unit configured to alter operational parameters of the distillation column.

Embodiment 4: the method of any of the previous embodiments, wherein the optical signal interrogator is adapted to measure sound at the at least one sensor location and wherein the output of the sensing cable is an acoustic parameter.

Embodiment 5: the method of embodiment 4, wherein classifying the output of the sensing cable includes comparing the acoustic parameter of the at least one sensor location to at least one of a first predetermined range of acoustic parameters corresponding to the unstable condition classification and a second predetermined range of acoustic parameters corresponding to the stable condition classification.

Embodiment 6: the method of embodiment 1, 2, or 3, wherein the optical signal interrogator is adapted to measure temperature at the at least one sensor location and wherein the output of the sensing cable is a temperature measurement.

Embodiment 7: the method of embodiment 6, wherein the at least one sensor location is provided within the tray of the distillation column a distance above a bottom surface of the tray corresponding to a froth level at the predetermined threshold, and wherein classifying the output of the sensing cable includes comparing the temperature at the at least one sensor location to at least one of a first predetermined range of temperatures corresponding to the unstable condition and a second predetermined range of temperatures corresponding to the stable condition.

Embodiment 8: the method of embodiment 6 or 7, wherein the sensing cable further includes a heating element aligned with the optical fiber sensor array, further comprising: propagating at least one heat pulse through the heating element along at least a portion of the sensing cable to affect an exchange of thermal energy between the heating element and one or more media exposed to the sensing cable; and wherein the optical signal interrogator is further adapted to measure a temperature profile of the sensing cable corresponding to the heat pulse at the at least one sensor location; and wherein classifying the output of the sensing cable includes determining one or more properties of the media exposed to the sensing cable at the at least one sensor location based on the temperature profile.

Embodiment 9: the method of embodiment 8, wherein classifying the output of the sensing cable further includes comparing the one or more properties of the media to at least one of a first predetermined range of properties corresponding to the stable condition classification and a second predetermined range of properties corresponding to the unstable condition classification.

Embodiment 10: the method of embodiment 8 or 9, wherein the optical fiber sensor array further includes a plurality of sensor locations aligned orthogonally to a bottom surface of the tray, and wherein determining one or more properties of the one or more media exposed to the sensing cable includes identifying a level of an interface between media in a froth state and a vapor state, and wherein classifying the output of the sensing cable includes comparing the level of the interface to at least one of a first predetermined range of interface levels corresponding to the stable condition classification and a second predetermined range of interface levels corresponding to the unstable condition classification.

Embodiment 11: the method of embodiment 10, wherein measuring the temperature profile corresponding to the heat pulse at each of the plurality of sensor locations includes, for each sensor location, measuring at least a heating temperature measurement during propagation of the heat pulse over the sensor location, a peak temperature measurement, and a cooling temperature measurement after propagation of the heat pulse over the sensor.

Embodiment 12: the method of embodiment 11, wherein determining the level of the interface includes calculating a difference in the heating temperature measurement, the peak temperature measurement, the cooling temperature measurement, or combination thereof, between adjacent sensor locations.

Embodiment 13: the method of embodiment 10, 11, or 12, wherein measuring the temperature profile corresponding to the heat pulse at each of the plurality of sensor locations includes, for each sensor location, measuring a plurality of temperatures over a period of time upon arrival of the heat pulse at the sensor location.

Embodiment 14: the method of embodiment 13, wherein determining the level of the interface includes, for each temperature profile, performing a regression of the plurality of temperatures over a logarithm of corresponding measurement times for a predetermined time window in the period of time to generate a slope and an intercept of the regression, wherein the slope and the intercept relate to one of the froth state or the vapor state at the sensor location.

Embodiment 15: the method of embodiment 14, wherein determining the level of the interface further includes calculating a difference in the slope and the intercept between adjacent sensor locations to identify the interface between media in the froth state and media in the vapor state at a predetermined level of the adjacent sensor locations.

Embodiment 16: the method of embodiment 13, 14, or 15, wherein determining the level of the interface includes, for each temperature profile: generating a time derivative by calculating a derivative of the plurality of temperature measurements with respect to time; applying a transform to the time derivative to generate a complex spectrum; and determining an amplitude and a phase of the complex spectrum, wherein the amplitude and the phase of the complex spectrum relate to one of the forth state or the vapor state at the sensor location.

Embodiment 17: the method of embodiment 16, wherein determining the level of the interface further includes, for each temperature profile: generating a frequency derivative spectrum by calculating the derivative of the complex spectrum with respect to frequency; and determining an amplitude and a phase of the frequency derivative spectrum, wherein the amplitude and the phase of the frequency derivative spectrum relate to one of the forth state or the vapor state at the sensor location.

Embodiment 18: the method of embodiment 17, wherein determining the level of the interface further includes calculating a difference in the amplitude and the phase between adjacent sensor locations to identify an interface between media in the froth state and media in the vapor state at a predetermined level of the adjacent sensor locations.

Embodiment 19: a system for detecting an operational condition of a tray of a distillation column, comprising: a sensing cable including an optical fiber sensor array provided within a tray of a distillation column; an optical signal interrogator operatively coupled with the optical fiber sensor array and adapted to receive a signal and configured to monitor an output of the sensing cable corresponding to at least one sensor location on the optical fiber sensor array; and a control unit, coupled the optical signal interrogator, to classify the output of the sensing cable as one of a predetermined set of classifications including at least a stable condition classification and a unstable condition classification determined based upon the output relative to a predetermined threshold, and configured to generate a signal when the output of the sensing cable is classified as the unstable condition classification.

Embodiment 20: the system of embodiment 19, further comprising one or more of an electronic display and an alarm adapted to receive the signal generated by the control unit.

Embodiment 21: the system of embodiment 19 or 20, wherein the control unit is further configured to alter operational parameters of the distillation column upon detection of the unstable condition.

Embodiment 22: the system of embodiment 19, 20, or 21, wherein the optical signal interrogator is adapted to measure sound at the at least one sensor location and wherein the output of the sensing cable is an acoustic parameter.

Embodiment 23: the system of embodiment 22, wherein the control unit is configured to classify the output of the sensing cable by comparing the acoustic parameter of the at least one sensor location to at least one of a first predetermined range of acoustic parameters corresponding to the unstable condition classification and a second predetermined range of acoustic parameters corresponding to the stable condition classification.

Embodiment 24: the system of embodiment 19, 20, or 21, wherein the optical signal interrogator is adapted to measure temperature at the at least one sensor location and wherein the output of the sensing cable is a temperature measurement.

Embodiment 25: the system of embodiment 24, wherein the at least one sensor location is provided within the tray of the distillation column a distance above a bottom surface of the tray corresponding to a froth level at the predetermined threshold, and wherein the control unit is configured to classify the output of the sensing cable by comparing the temperature at the at least one sensor location to at least one of a first predetermined range of temperatures corresponding to the unstable condition and a second predetermined range of temperatures corresponding to the stable condition.

Embodiment 26: the system of embodiment 24 or 25, wherein the sensing cable further includes a heating element aligned with the optical fiber sensor array, further comprising: an excitation source configured to propagate at least one heat pulse through the heating element along at least a portion of the sensing cable to affect an exchange of thermal energy between the heating element and one or more media exposed to the sensing cable; and wherein the optical signal interrogator is further adapted to measure a temperature profile of the sensing cable corresponding to the heat pulse at the at least one sensor location; and wherein the control unit is configured to classify the output of the sensing cable by determining one or more properties of the media exposed to the sensing cable at the at least one sensor location based on the temperature profile.

Embodiment 27: the system of embodiment 26, wherein the control unit is further configured to classify the output of the sensing cable by further comparing the one or more properties of the media to at least one of a first predetermined range of properties corresponding to the stable condition classification and a second predetermined range of properties corresponding to the unstable condition classification.

Embodiment 28: the system of embodiment 26 or 27, wherein the optical fiber sensor array further includes a plurality of sensor locations aligned orthogonally to a bottom surface of the tray, and wherein the control unit is further configured to determine one or more properties of the one or more media exposed to the sensing cable by identifying a level of an interface between media in a froth state and a vapor state, and classify the output of the sensing cable includes comparing the level of the interface to at least one of a first predetermined range of interface levels corresponding to the stable condition classification and a second predetermined range of interface levels corresponding to the unstable condition classification.

Embodiment 29: the system of embodiment 28, wherein the optical signal interrogator is further configured to measure the temperature profile corresponding to the heat pulse at each of the plurality of sensor locations by, for each sensor location, measuring at least a heating temperature measurement during propagation of the heat pulse over the sensor location, a peak temperature measurement, and a cooling temperature measurement after propagation of the heat pulse over the sensor.

Embodiment 30: the system of embodiment 29, wherein the control unit is further configured to determine the level of the interface by calculating a difference in the heating temperature measurement, the peak temperature measurement, the cooling temperature measurement, or combination thereof, between adjacent sensor locations.

Embodiment 31: the system of embodiment 28, 29, or 30, wherein the optical signal interrogator is further configured to measure the temperature profile corresponding to the heat pulse at each of the plurality of sensor locations by, for each sensor location, measuring a plurality of temperatures over a period of time upon arrival of the heat pulse at the sensor location.

Embodiment 32: the system of embodiment 31, wherein the control unit is further configured to determine the level of the interface by, for each temperature profile, performing a regression of the plurality of temperatures over a logarithm of corresponding measurement times for a predetermined time window in the period of time to generate a slope and an intercept of the regression, wherein the slope and the intercept relate to one of the froth state or the vapor state at the sensor location.

Embodiment 33: the system of embodiment 32, wherein the control unit is further configured to determine the level of the interface by calculating a difference in the slope and the intercept between adjacent sensor locations to identify the interface between media in the froth state and media in the vapor state at a predetermined level of the adjacent sensor locations.

Embodiment 34: the system of embodiment 31, 32, or 33, wherein the control unit is further configured to determine the level of the interface by, for each temperature profile: generating a time derivative by calculating a derivative of the plurality of temperature measurements with respect to time; applying a transform to the time derivative to generate a complex spectrum; and determining an amplitude and a phase of the complex spectrum, wherein the amplitude and the phase of the complex spectrum relate to one of the forth state or the vapor state at the sensor location.

Embodiment 35: the system of embodiment 34, wherein the control unit is further configured to determine the level of the interface by, for each temperature profile: generating a frequency derivative spectrum by calculating the derivative of the complex spectrum with respect to frequency; and determining an amplitude and a phase of the frequency derivative spectrum, wherein the amplitude and the phase of the frequency derivative spectrum relate to one of the forth state or the vapor state at the sensor location.

Embodiment 36: the system of embodiment 35, wherein the control unit is further configured to determine the level of the interface by calculating a difference in the amplitude and the phase between adjacent sensor locations to identify an interface between media in the froth state and media in the vapor state at a predetermined level of the adjacent sensor locations.

\* \* \*

While the disclosed subject matter is described herein in terms of certain exemplary embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A method for detecting an operational condition of a tray of a distillation column, comprising:
 providing within a tray of a distillation column a sensing cable including an optical fiber sensor array having at least one sensor location, the optical fiber sensor array operatively coupled to an optical signal interrogator, wherein one of the at least one sensor location being located in the distillation column in the vicinity of a tray;
 monitoring with the optical signal interrogator an output of the sensing cable corresponding to at least one sensor location on the optical fiber sensor array;
 classifying the output of the sensing cable as one of a predetermined set of classifications including at least a stable condition classification and a unstable condition classification determined based upon the output relative to a predetermined threshold; and
 generating a signal when the output of the sensing cable is classified as the unstable condition classification.

2. The method of claim 1, wherein generating the signal includes transmitting the signal to one or more of an electronic display or an alarm.

3. The method of claim 1, wherein generating the signal includes transmitting the signal to a control unit configured to alter operational parameters of the distillation column.

4. The method of claim 1, wherein the optical signal interrogator is adapted to measure sound at the at least one sensor location and wherein the output of the sensing cable is an acoustic parameter.

5. The method of claim 4, wherein classifying the output of the sensing cable includes comparing the acoustic parameter of the at least one sensor location to at least one of a first predetermined range of acoustic parameters corresponding to the unstable condition classification and a second predetermined range of acoustic parameters corresponding to the stable condition classification.

6. The method of claim 4, wherein the optical signal interrogator is adapted to measure temperature at the at least one sensor location and wherein the output of the sensing cable is a temperature measurement.

7. The method of claim 6, wherein the at least one sensor location is provided within the distillation column a distance above a bottom surface of the tray corresponding to a froth level at the predetermined threshold, and wherein classifying the output, of the sensing cable includes comparing the temperature at the at least one sensor location to at least one of a first predetermined range of temperatures corresponding to the unstable condition and a second predetermined range of temperatures corresponding to the stable condition.

8. The method of claim 6, wherein the sensing cable further includes a heating element aligned with the optical fiber sensor array, further comprising:
 propagating at least one heat pulse through the heating element along at least a portion of the sensing cable to affect an exchange of thermal energy between the heating element and one or more media exposed to the sensing cable; and
 wherein the optical signal interrogator is further adapted to measure a temperature profile of the sensing cable corresponding to the heat pulse at the at least one sensor location; and
 wherein classifying the output of the sensing cable includes determining one or more properties of the media exposed to the sensing cable at the at least one sensor location based on the temperature profile.

9. The method of claim 8, wherein classifying the output of the sensing cable further includes comparing the one or more properties of the media to at least one of a first predetermined range of properties corresponding to the stable condition classification and a second predetermined range of properties corresponding to the unstable condition classification.

10. The method of claim 8, wherein the optical fiber sensor array further includes a plurality of sensor locations aligned orthogonally to a bottom surface of the tray, and wherein determining one or more properties of the one or more media exposed to the sensing cable includes identifying a level of an interface between media in a froth state and a vapor state, and wherein classifying the output of the sensing cable includes comparing the level of the interface to at least one of a first predetermined range of interface levels corresponding to the stable condition classification and a second predetermined range of interface levels corresponding to the unstable condition classification.

11. The method of claim 10, wherein measuring the temperature profile corresponding to the heat pulse at each of the plurality of sensor locations includes, for each sensor location, measuring at least a heating temperature measurement during propagation of the heat pulse over the sensor location, a peak temperature measurement, and a cooling temperature measurement after propagation of the heat pulse over the sensor.

12. The method of claim 11, wherein determining the level of the interface includes calculating a difference in the heating temperature measurement, the peak temperature measurement, the cooling temperature measurement, or combination thereof, between adjacent sensor locations.

13. The method of claim 10, wherein measuring the temperature profile corresponding to the heat pulse at each of the plurality of sensor locations includes, for each sensor location, measuring a plurality of temperatures over a period of time upon arrival of the heat pulse at the sensor location.

14. The method of claim 13, wherein determining the level of the interface includes, for each temperature profile, performing a regression of the plurality of temperatures over a logarithm of corresponding measurement times for a predetermined time window in the period of time to generate a slope and an intercept of the regression, wherein the slope and the intercept relate to one of the froth state or the vapor state at the sensor location.

15. The method of claim 14, wherein determining the level of the interface further includes calculating a difference in the slope and the intercept between adjacent sensor locations to identify the interface between media in the froth state and media in the vapor state at a predetermined level of the adjacent sensor locations.

16. The method of claim 13, wherein determining the level of the interface includes, for each temperature profile:
 generating a time derivative by calculating a derivative of the plurality of temperature measurements with respect to time;
 applying a transform to the time derivative to generate a complex spectrum; and determining an amplitude and a phase of the complex spectrum, wherein the amplitude and the phase of the complex spectrum relate to one of the forth state or the vapor state at the sensor location.

17. The method of claim 16, wherein determining the level of the interface further includes, for each temperature profile:
generating a frequency derivative spectrum by calculating the derivative of the complex spectrum with respect to frequency; and
determining an amplitude and a phase of the frequency derivative spectrum, wherein the amplitude and the phase of the frequency derivative spectrum relate to one of the forth state or the vapor state at the sensor location.

18. The method of claim 17, wherein determining the level of the interface further includes calculating a difference in the amplitude and the phase between adjacent sensor locations to identify an interface between media in the froth state and media in the vapor state at a predetermined level of the adjacent sensor locations.

19. A system for detecting an operational condition of a tray of a distillation column, comprising:
a sensing cable including an optical fiber sensor array provided within a tray of a distillation column, wherein the optical fiber sensor array having at least one sensor location, wherein one of the at least one sensor location being located in the distillation column in the vicinity of a tray;
an optical signal interrogator operatively coupled with the optical fiber sensor array and adapted to receive a signal and configured to monitor an output of the sensing cable corresponding to at least one sensor location on the optical fiber sensor array; and
a control unit, coupled to the optical signal interrogator, to classify the output of the sensing cable as one of a predetermined set of classifications including at least a stable condition classification and a unstable condition classification determined based upon the output relative to a predetermined threshold, and configured to generate a signal when the output of the sensing cable is classified as the unstable condition classification.

20. The system of claim 19, further comprising one or more of an electronic display and an alarm adapted to receive the signal generated by the control unit.

21. The system of claim 19, wherein the control unit is further configured to alter operational parameters of the distillation column upon detection of the unstable condition.

22. The system of claim 19, wherein the optical signal interrogator is adapted to measure sound at the at least one sensor location and wherein the output of the sensing cable is an acoustic parameter.

23. The system of claim 22, wherein the control unit is configured to classify the output of the sensing cable by comparing the acoustic parameter of the at least one sensor location to at least one of a first predetermined range of acoustic parameters corresponding to the unstable condition classification and a second predetermined range of acoustic parameters corresponding to the stable condition classification.

24. The system of claim 19, wherein the optical signal interrogator is adapted to measure temperature at the at least one sensor location and wherein the output of the sensing cable is a temperature measurement.

25. The system of claim 24, wherein the at least one sensor location is provided within the distillation column a distance above a bottom surface of the tray corresponding to a froth level at the predetermined threshold, and wherein the control unit is configured to classify the output of the sensing cable by comparing the temperature at the at least one sensor location to at least one of a first predetermined range of temperatures corresponding to the unstable condition and a second predetermined range of temperatures corresponding to the stable condition.

26. The system of clam 24, wherein the sensing cable further includes a heating element aligned with the optical fiber sensor array, further comprising:
an excitation source configured to propagate at least one heat pulse through the heating element along at least a portion of the sensing cable to affect an exchange of thermal energy between the heating element and one or more media exposed to the sensing cable; and
wherein the optical signal interrogator is further adapted to measure a temperature profile of the sensing cable corresponding to the heat pulse at the at least one sensor location; and
wherein the control unit is configured to classify the output of the sensing cable by determining one or more properties of the media exposed to the sensing cable at the at least one sensor location based on the temperature profile.

27. The system of claim 26, wherein the control unit is further configured to classify the output of the sensing cable by further comparing the one or more properties of the media to at least one of a first predetermined range of properties corresponding to the stable condition classification and a second predetermined range of properties corresponding to the unstable condition classification.

28. The system of claim 26, wherein the optical fiber sensor array further includes a plurality of sensor locations aligned orthogonally to a bottom surface of the tray, and wherein the control unit is further configured to determine one or more properties of the one or more media exposed to the sensing cable by identifying a level of an interface between media in a froth state and a vapor state, and classify the output of the sensing cable includes comparing the level of the interface to at least one of a first predetermined range of interface levels corresponding to the stable condition classification and a second predetermined range of interface levels corresponding to the unstable condition classification.

29. The system of claim 28, wherein the optical signal interrogator is further configured to measure the temperature profile corresponding to the heat pulse at each of the plurality of sensor locations by, for each sensor location, measuring at least a heating temperature measurement during propagation of the heat pulse over the sensor location, a peak temperature measurement, and a cooling temperature measurement after propagation of the heat pulse over the sensor.

30. The system of claim 29, wherein the control unit is further configured to determine the level of the interface by calculating a difference in the heating temperature measurement, the peak temperature measurement, the cooling temperature measurement, or combination thereof between adjacent sensor locations.

31. The system of claim 28,, wherein the optical signal interrogator is further configured to measure the temperature profile corresponding to the heat pulse at each of the plurality of sensor locations by, for each sensor location, measuring a plurality of temperatures over a period of time upon arrival of the heat pulse at the sensor location.

32. The system of claim 31, wherein the control unit is further configured to determine the level of the interface by, for each temperature profile, performing a regression of the plurality of temperatures over a logarithm of corresponding measurement times for a predetermined time window in the period of time to generate a slope and an intercept of the regression, wherein the slope and the intercept relate to one of the froth state or the vapor state at the sensor location.

33. The system of claim 32, wherein the control unit is further configured to determine the level of the interface by calculating a difference in the slope and the intercept between adjacent sensor locations to identify the interface between media in the froth state and media in the vapor state at a predetermined level of the adjacent sensor locations.

34. The system of claim 31, wherein the control unit is further configured to determine the level of the interface by, for each temperature profile:
  generating a time derivative by calculating a derivative of the plurality of temperature measurements with respect to time;
  applying a transform to the time derivative to generate a complex spectrum; and
  determining an amplitude and a phase of the complex spectrum, wherein the amplitude and the phase of the complex spectrum relate to one of the forth state or the vapor state at the sensor location.

35. The system of claim 34, wherein the control unit is further configured to determine the level of the interface by, for each temperature profile:
  generating a frequency derivative spectrum by calculating the derivative of the complex spectrum with respect to frequency; and
  determining an amplitude and a phase of the frequency derivative spectrum, wherein the amplitude and the phase of the frequency derivative spectrum relate to one of the forth state or the vapor state at the sensor location.

36. The system of claim 35, wherein the control unit is further configured to determine the level of the interface by calculating a difference in the amplitude and the phase between adjacent sensor locations to identify an interface between media in the froth state and media in the vapor state at a predetermined level of the adjacent sensor locations.

* * * * *